United States Patent
Wu et al.

(10) Patent No.: US 10,152,730 B2
(45) Date of Patent: *Dec. 11, 2018

(54) SYSTEMS AND METHODS FOR ADVERTISING USING SPONSORED VERBS AND CONTEXTS

(71) Applicant: Excalibur IP, LLC, New York, NY (US)

(72) Inventors: Tingyi Wu, Sunnyvale, CA (US); Enrique Andres Munoz Torres, Mountain View, CA (US); Sophia Thitirat Perl, San Jose, CA (US); Andrew Poon, San Francisco, CA (US); Conrad Wai, San Francisco, CA (US); Michael Eric Plasmeier, Mountain View, CA (US)

(73) Assignee: Excalibur IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,656

(22) Filed: Jan. 30, 2017

(65) Prior Publication Data

US 2017/0140439 A1 May 18, 2017

Related U.S. Application Data

(63) Continuation of application No. 14/292,467, filed on May 30, 2014, now Pat. No. 9,595,048.

(51) Int. Cl.
*G06F 17/30* (2006.01)
*G06Q 30/02* (2012.01)

(52) U.S. Cl.
CPC ... *G06Q 30/0275* (2013.01); *G06F 17/30528* (2013.01); *G06F 17/30554* (2013.01); *G06F 17/30864* (2013.01); *G06Q 30/0256* (2013.01)

(58) Field of Classification Search
None
See application file for complete search history.

(56) References Cited

U.S. PATENT DOCUMENTS

| | | | |
|---|---|---|---|
| 8,180,804 B1* | 5/2012 | Narayanan | G06F 17/30867 707/798 |
| 8,990,234 B1* | 3/2015 | Myslinski | G06F 17/30867 707/710 |
| 2007/0156757 A1* | 7/2007 | Tang | G06F 17/30864 |

(Continued)

*Primary Examiner* — Hung D Le
(74) *Attorney, Agent, or Firm* — Brinks Gilson & Lione

(57) ABSTRACT

A system stored in a non-transitory medium executable by processor circuitry is provided for generating sponsored verbs and contexts. The system includes interface circuitry for receiving a search query from a user device and query processing circuitry for identifying search results comprising entity search result objects and non-entity search result objects related to the search query. Targeting circuitry determines a set of verb keywords associated with the search result objects and analytics circuitry selects one or more sponsored verbs for at least one entity or non-entity search result. Display logic circuitry is communicatively coupled to the interface circuitry and dynamically generates interface elements for each of the one or more sponsored verbs, and displays, in response to the search query, the interface elements as a sub-component of the at least one entity or non-entity search result.

20 Claims, 13 Drawing Sheets

(56) References Cited

U.S. PATENT DOCUMENTS

| | | | |
|---|---|---|---|
| 2008/0114762 A1* | 5/2008 | Fukuda | G06Q 30/02 |
| 2009/0150388 A1* | 6/2009 | Roseman | G06F 17/278 |
| 2011/0314032 A1* | 12/2011 | Bennett | G06F 17/30684 |
| | | | 707/749 |
| 2012/0011141 A1* | 1/2012 | Park | G06F 17/3043 |
| | | | 707/769 |
| 2012/0011167 A1* | 1/2012 | Schmidt | G06F 17/3087 |
| | | | 707/802 |
| 2012/0179707 A1* | 7/2012 | Hobbs | G06F 9/445 |
| | | | 707/769 |
| 2012/0303561 A1* | 11/2012 | Sathish | G06F 17/30873 |
| | | | 706/14 |
| 2013/0159272 A1* | 6/2013 | Donmez | G06F 17/30637 |
| | | | 707/706 |
| 2014/0149393 A1* | 5/2014 | Bhatt | G06F 17/30867 |
| | | | 707/722 |
| 2014/0180825 A1* | 6/2014 | Ramer | G06Q 30/0267 |
| | | | 705/14.64 |
| 2014/0280081 A1* | 9/2014 | Tropin | G06F 17/30684 |
| | | | 707/723 |
| 2015/0006501 A1* | 1/2015 | Talmon | G06F 17/30958 |
| | | | 707/708 |
| 2015/0088846 A1* | 3/2015 | Roe | G06F 17/3089 |
| | | | 707/706 |
| 2015/0127591 A1* | 5/2015 | Gupta | G06N 5/04 |
| | | | 706/12 |
| 2015/0154246 A1* | 6/2015 | Allen | G06F 17/3053 |
| | | | 707/758 |
| 2015/0227973 A1* | 8/2015 | Wirtz | G06F 17/30705 |
| | | | 705/14.57 |

\* cited by examiner

SYSTEMS AND METHODS FOR ADVERTISING USING SPONSORED VERBS AND CONTEXTS

CROSS-REFERENCE TO RELATED APPLICATIONS

This application is a continuation of U.S. patent application Ser. No. 14/292,467, filed May 30, 2014.

TECHNICAL FIELD

The present description relates generally to a system and method, generally referred to as a system, sponsorship and monetization of entity based content. In particular, the present description relates to targeted advertising and sponsorship using sponsored verbs and contexts. This application also relates to modular search objects and frameworks for supporting entity-based content, modular search objects, and user interactions with the aforementioned.

BACKGROUND

It is common for users to enter a query consisting of one or more keywords and execute a search on a web page. Typically, search results are provided on a search results page that displays a list of links with titles. Sponsored and non-sponsored search results may be interleaved on the results page and displayed alongside a sponsored advertisement. Search providers rely on sponsored search results and placing advertisements alongside results to generate revenue.

Increasingly, users are executing searches on mobile devices, such as smartphones or tablets. However, the traditional technique of providing a list of results is not well-suited to the particular technical constraints of a mobile device, such as display and touchscreen constraints, as well as use case constraints associated with mobile devices, such as use during transit, for example. There is, therefore, a set of engineering problems to be solved in order to provide search results to users that are well adapted to mobile devices or mobile device interfaces to other devices (such as televisions).

Additionally, mobile device present technical constraints and limits that make conventional sponsored content impractical in the mobile context. Consequently, the monetization of search results that are adapted to mobile devices or mobile device interfaces to other devices raises further technical problems to be solved as well. For example, placement of conventional sponsored ads in the mobile context may be intrusive to the user experience and may not be feasible given the restraints of mobile displays. Mobile users are simply unwilling to use applications that devote large portions of their limited screen space to advertisements or promoted listings. Given that search providers are no longer able to place targeted content alongside or interleaved with search results, traditional use of keywords to identify and place advertisements raises significant technical barriers to monetization and is no longer sufficient for mobile devices. Consequently, there exists an additional set of engineering problems to be solved in order to monetize content adapted for use and display on mobile devices.

SUMMARY

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

In one aspect or embodiment, a system stored in a non-transitory medium executable by processor circuitry is provided for generating sponsored verbs and contexts. The system includes interface circuitry for receiving a search query from a user device and query processing circuitry for identifying search results comprising entity search result objects and non-entity search result objects related to the search query. Targeting circuitry determines a set of verb keywords associated with the search result objects and analytics circuitry selects one or more sponsored verbs for at least one entity or non-entity search result. Display logic circuitry is communicatively coupled to the interface circuitry and dynamically generates interface elements for each of the one or more sponsored verbs, and displays, in response to the search query, the interface elements as a sub-component of the at least one entity or non-entity search result.

In another aspect or embodiment, a computer-implemented method is provided for generating sponsored verbs and contexts. The method includes processing, by query processing circuitry communicatively coupled to a network communications circuitry, a search query to identify search result objects associated with the search query and receiving, at the network communications circuitry, a search result object associated with the search query. Targeting circuitry also processes the search query and search result object to determine a set of action words associated with the search query and search result object. Display logic circuitry generates interface elements associated with each of the action words to be displayed as a sub-component of the search result object, wherein the interface elements trigger, in response to a user selecting the interface element, a responsive action that is customized by an advertiser and related to the action word.

In a third aspect or embodiment, a system is provided that includes a means for generating sponsored verbs and contexts that includes a means for receiving a user search query and identifying a search result object associated with the search query and a means for identifying a set of contexts and intents associated with the search query. The system also includes a means for identifying a set of verbs related to the search result object and the set of contexts and intents and a means for generating a call-to-action interface element that triggers a responsive action that was associated with the call-to-action interface element by an advertiser when a user selects the call-to-action interface element.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
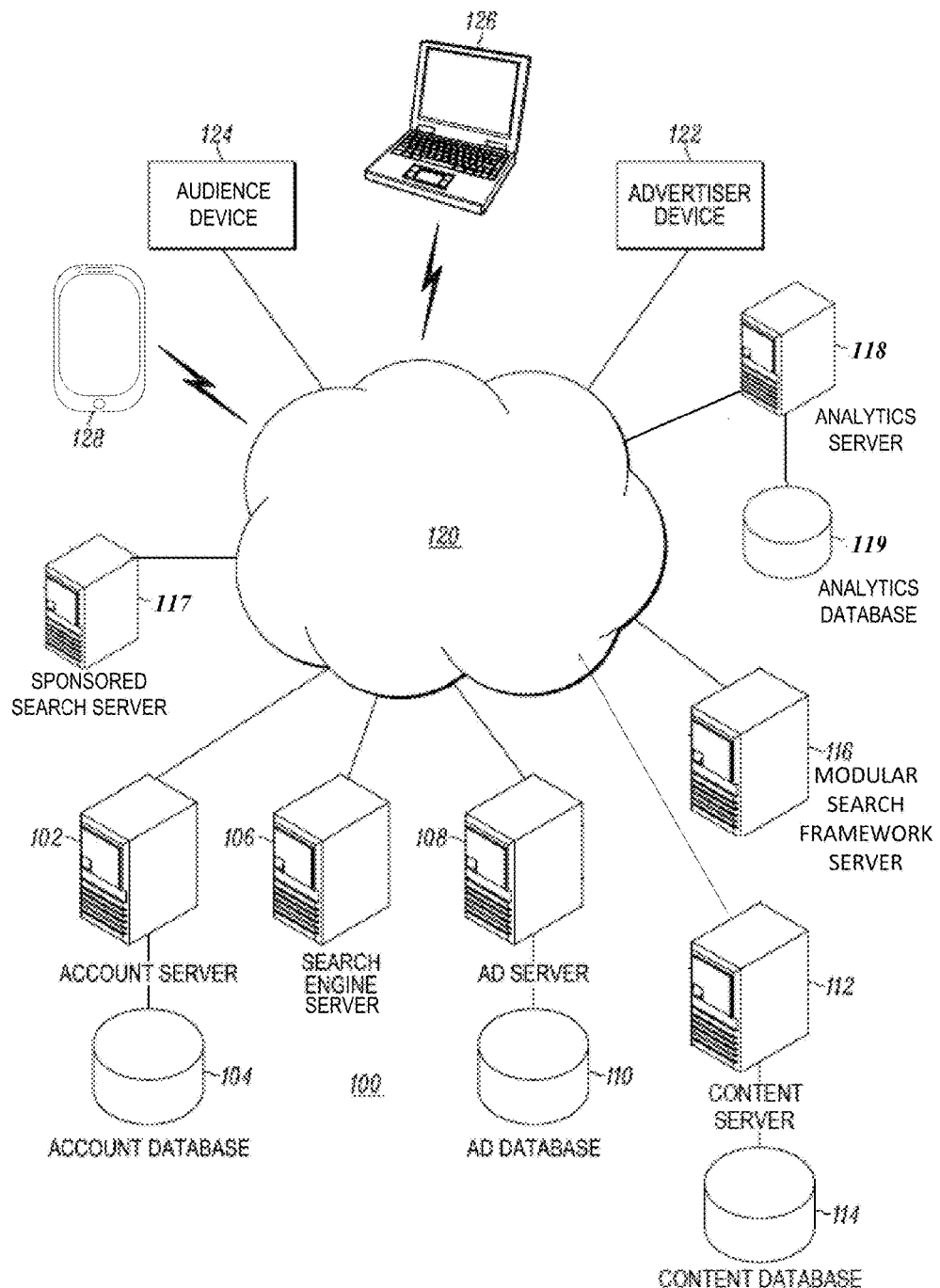
FIG. 1 illustrates a block diagram of an exemplary information system depicting example devices of an exemplary network that can provide aspects of a modular search object framework for utilizing sponsored verbs and contexts.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Overview

By way of introduction, novel systems, methods, and circuitry related to the sponsorship and monetization of mobile based search results and content (such as entity-based search results and elements of graphical user interfaces (GUIs)) are provided herein. Also provide herein are novel systems, methods, and circuitry related to the sponsorship and monetization of modular search objects and frameworks for supporting entity based content, modular search objects, and user interactions with the aforementioned. For example, technologies described herein provide for sponsorship of content within a modular search object framework.

Traditional technical solutions employed by advertisement systems utilizing keyword matching to display advertisements in webpage margins or as sponsored search results interleaved throughout a search results page are no longer feasible given the technical constraints of presenting content on mobile devices, for example. Given the typical manner of use of devices, mobile users are simply unwilling to devote large portions of their display to advertisements or promoted listings. Traditional monetization solutions, therefore, result in unusable or intrusive applications and lead to declining use and monetization revenue. The various embodiments of the present description solve these technical problems related to sponsorship and monetization by providing engineering solutions for less intrusive advertising and a more manageable environment for online browsing in a mobile context. Further, the present description solves technical shortcomings of traditional keyword advertising which, only allows search providers to display ads when the keyword the advertiser entered is relatively similar (or even exactly the same) to a query entered by a user.

When a user searches for a specific business entity, such as a restaurant, usually it is the intent of the user to retrieve information associated with the entity, such as service and product information, contact information, and information regarding related entities. For example, given a food and beverage business, such as a hypothetical coffee company named Green Can Coffee, a user searching online for Green Can Coffee may likely intend to discover a location of a Green Can Coffee storefront, a phone number for that location, and a review on the location and perhaps Green Can Coffee in general. Not only do users want the information, but also they want it delivered quickly and in a seamless manner. This is especially the case with users on mobile devices, since there is a likelihood that the user is on the go. To provide such information with or within conventional lists of search results can be difficult to parse for a user equipped with a small screen. This is especially the case when the user is in transit.

In the mobile context, the user may want the nearest location of a particular establish or franchise of an entity, such as a location of a Green Can Coffee storefront in a nearby city. That user may also want directions to the storefront and reviews on the storefront. Also, a user may want to know hours the entity operates, links to coupons or offers the entity is currently providing, and links to download or interact with applications provided by or associated with the entity.

Any of the predicted intents of a user can be captured by tracking user interactions with the mobile device and the accompanying applications. The predictions can be based on the tracked interactions, such as during actual use, and can then be used make a determination about what content the user likely desires and then provide that content. Such functionality and content for each entity can be provided and maintained by the entity, an agent of the entity, or the service provider providing the modular search object framework. To the benefit of the consumer and the advertiser, a content network provider or search engine provider can provide content and search results in a manner that is more digestible to a mobile device user through the framework. As mentioned, a long list of links to webpages may be cumbersome with a smaller display, whether those webpages are adapted for a mobile context or not.

Commonly owned U.S. patent application Ser. No. 14/266,458, filed Apr. 30, 2014, entitled Modular Search Object Framework, which is hereby incorporated by reference in its entirety, describes a modular search object framework for displaying graphical search results for entity and non-entity search results and search suggestion objects. An entity search result is a search result that is based on a particular entity (such as a particular person, place, or thing). An entity search result is distinguishable from non-entity content in that in a system, such as a system of a content provider, content for a particular entity is delivered through a single root object made up of one or more sub-objects or modular components. Each of module components of the root object can be dynamically generated and arranged in a custom manner based on the user query or the determined user intent.

For example, a user of a mobile device may enter a search a business called Green Can Coffee. Green Can Coffee is a thing (or proper noun), in this case a business, and in the exemplary entity based system, there may be only one root object associated Green Can Coffee. In traditional non-entity based content systems, however, there may be many root objects for the thing Green Can Coffee, including websites that contain the keywords "green can coffee." In the entity based system, the root object is generally associated with the entity itself, but may be comprised of a number of a sub-objects or individual module components that may be individually and dynamically generated by the system circuitry, as described further in connection with FIG. 13 and its accompanying text. With a non-entity search result, on the other hand, the result is not necessarily associated with one root object for a particular entity; there may be many root search results for a particular entity. Also, in a non-entity based system, there may be multiple root graphical user interfaces (GUIs), such as multiple root webpages, for a single entity.

Additionally, the system circuitry (such as context circuitry 206 of FIG. 2 or processor circuitry 1302 of FIG. 13) may determine one or more intents and/or contexts associated with the user query or the context in which the entity information (or non-entity information) was accessed. The intent, for example, may identify the purpose behind the user's query or an objective of the user that may be of importance to the user at the time the content is displayed. An intent may be determined primarily from the user's query itself, but may also be determined by considering a number of additional factors, such as the user's historical actions, the similarity of the action or to query to the actions or queries of other users, tap through rates of users on the various modules or sub-objects, and/or information extracted from the user's personal data, such as locally stored cookies or the user's associated accounts (e.g., email, calendar, social networks, web tools, etc.). Further, system circuitry may associate a confidence level with each of the determined intents representing the likelihood that the intent and corresponding module will be of interest to the user.

For example, a user may access a mobile search page implemented by the modular framework and enter a query for "springfield hotels." The search is not associated with any specific entity and a traditional search framework would return ads associated with a number of cities (e.g., Springfields located in MA, VA, MO, and IL). Systems implemented in accordance with the modular framework described herein, however, are able to extract data from the users account to determine one or more intents that are likely to be associated with the search. The system analytics circuitry may, for example, parse the user's data to determine that the user is scheduled to fly into Springfield, Ill. that night. The system circuitry may then generate an intent that the user may be interested in hotels in Springfield, Ill. having vacancy on that same day. In this scenario, the system circuitry can dynamically generate one or more modular components of the search result tailored to the identified intent, such as a displaying a hotel with vacancy data, address, telephone, check-in dates, and other information that may be associated with the particular intent. This data can be even more personalized and dynamic when the user's search is directly related to a particular entity, e.g. the name of an actual hotel in Springfield, Ill., or even a national chain having hotel branches in Springfield, Ill.

A context, on the other hand, may consist of parameters defining additional information about the target of the user's query or the context in which the user's query is executed. In the above example, a context may be associated with the day on which the search was executed, such that the check-in and check-out information provides an additional context for targeting the displayed results to the user. Similarly, a context may consist of contextual information about the state of the user's device derived from one or more parameters of phone operation determined from localized data (or distributed data) and/or native phone capabilities, such as the accelerometer, gyroscope, GPS, or WiFi. For example, if a phone is in airplane mode, the system can identify a context that the phone has limited feature availability and that the user may be bored or otherwise susceptible to targeting. In this case, a context may be available for targeting for installing activity applications, such as games. Returning to the original example, the user may have queried for "springfield hotels may 30," and in this instance, the system may determine a related context of check in date of May 30. If no explicit context was entered in the query, the system may provide a default context associated with the query term or determine a context based on any known search device data (such as location, application use, operative characteristics, etc.). For example, in the case of "springfield hotels," the default context may be to search for hotels in Springfield, Ill. with having vacancy on that same day.

Because the modular system is entity and context aware, each entity may be treated like an individual application that may be interacted with by the user. Applications have sub-components that are dynamically generated based on multiple, optional contexts associated with the particular access. In this way, the system circuitry creates a rich, dynamic context for search results with portions of the search results for a particular entity be dynamically generated based on intents or contexts determined to be applicable to the particular search (see, e.g., FIGS. 7-11 and accompanying text). This modular framework being described, a person having skill in the art would appreciate that typical keyword targeting creates technical barriers to efficiently monetizing the module search results. For example, ads associated with keywords are often irrelevant to determined user intents and cumbersome to display. There is presented, therefore, a set of engineering problems to be solved in order to monetize the modular content adapted to mobile devices.

In accordance with the present description, one engineering solution to the aforementioned technical barriers is presented by a system that allows advertisers to target the intents and contexts determined by the system circuitry for a particular search as opposed to relying primarily on keywords. In one aspect, the novel system is designed to provide a marketplace allowing advertisers to target the actual user actions, which are representative of the user intent and contexts, in the form of sponsored verbs. Sponsored verbs can include every aspect of an entity result or modular sub-component that a potential customer would interact with for the business entities or products. As non-limiting examples, sponsored verbs associated with user actions could include "send" (SMS or email message), "call" (a phone number), "reserve" (a table), "book" (a ticket or reservation), "route" (directions), "ride" (a taxi), "read" (a review), "rent" (a movie or DVD), "order" (takeout), "check-in" (to a social network), "print" (a coupon), "redeem" (credit card points for the product), "check-in" (to a hotel), "buy" (a product), "pay," "review," "share" (a photo), "save" (an offer), "redeem" (a coupon), and "more" or "view" (additional information). Each of these, and other, verbs or actions that a user may take while interacting with a search result can be targeted by an advertiser. In addition, combinations of these verbs with determined contexts or intents may also be targeted by advertisers. This results in a more valuable advertisement because it the user's action is directly tied to the intent associated with user's interest at that particular moment. Additionally, as described further in connection with FIG. 9, an advertiser can utilize the marketplace implemented by the system circuitry to customize the responsive action taken in response to the event, such as when the user clicks on the sponsored verb, allowing for further dynamic and personalized responses.

In some embodiments, the sponsored verbs are in turn used to create "call-to-action buttons" or interactive elements that trigger the responsive action specified by the advertiser at the time of bidding, or a default action that may be determined by the system circuitry. The call-to-action controls may take the form of graphical buttons, links, or any other form of an interactive interface element and are intended to represent the sponsored verb verbs related to the user intent. In this way, the system circuitry dynamically generates content and interface elements to be displayed as portions of the search results themselves and gives advertisers direct access to the users' actions representative of their intent. In other words, the users' actual actions are used in order to more efficiently gauge the user's interest in receiving particular advertisements or having dynamic responsive actions triggered by the mobile device. This in turn leads to more relevant advertisements and responsive actions to user clicks or tap throughs because the advertisements are directly tied to the action that is of interest to the user at that particular moment. This results in a more valuable advertisement or responsive action to the event based directly on the user's action.

For example, an advertiser associated with a rental application for a smartphone may have bid on the sponsored verb "rent" and may have entered campaign parameters associating the sponsored verb with a deeplink to a mobile application. If a user searches for a movie title, an interactive interface element may be dynamically generated using sponsor information and campaign parameters to create a call-to-action button that displays the information "Rent this Movie" with the rental application. The deeplink may access the mobile application on the user's smartphone (or the app store if the application is not installed) and link the user to a nearby retail location where the video is available for rent. In addition, in some embodiments, the interactive interface element may trigger a drop down menu or interface overlay of multiple, related interactive interface elements that are associated with the query and/or determined intent or context. Each of these individual interface elements can be separately monetized using multiple auctions.

As a further monetization scheme, advertisers that own or are otherwise associated with an entity search result can also customize their own summary page and create sponsored content that can be dynamically adapted by the system using the identified intents and contexts. This novel feature provides an enhanced user experience, which in turn may increase revenue for the advertiser and the service provider monetizing the content. Additionally or alternatively, search results and related GUIs may include algorithmically generated summary sub-GUIs providing a more cohesive experience for a user than a list of search results. Each of these sub-GUIs or modular components can be monetized utilizing sponsored verbs and based on identified contexts and intents, either individually or as a whole.

DESCRIPTION OF THE DRAWINGS

In the modular framework of the present description, the presentation of search results for entity and non-entity content may include multiple interactive objects each interactive object may include links and other forms of information attached and viewable on the interactive object. Such information may include a detailed summary on the entity and of other content related to the entity, as well as links to other related content and entities. Such information may be created by display logic circuitry communicatively coupled with one or more other circuit components of the module circuitry. The information can be dynamically generated so that it is displayed as one root GUI object for each entity or non-entity search result. Each root GUI may then include numerous sub-GUI objects or modular components that are generated by the module circuitry, such as those provided as maps circuitry or summary circuitry, or displayed in a tray of the entity card as described in commonly owned U.S. patent application Ser. No. 14/266,458, filed Apr. 30, 2014, entitled Modular Search Object Framework, which is incorporated herein.

Referring now to the figures, FIG. 1 illustrates a block diagram of an example information system that includes example devices of a network that can provide a modular search object framework, and through the framework can provide monetized and/or sponsored online information, such as monetized and/or sponsored entity search results and related GUIs utilizing sponsored verbs or contexts. Online information or graphical elements containing such information is monetized when such information or element is utilized as a source of revenue. Online information or graphical elements containing such information is sponsored when such information or element is paid for or at least claimed by an advertiser such as an advertising organization, person, group of people, or any combination thereof.

The information system 100 in the example of FIG. 1 includes an account server 102, an account database 104, a search engine server 106, an ad server 108, an ad database 110, a content database 114, a content server 112, a modular search framework server 116 (which can also be communicatively coupled with a corresponding database), a sponsored search server 117 (which can also be communicatively coupled with a corresponding database), an analytics server 118, and an analytics database 119. The aforementioned servers and databases can be communicatively coupled over a network 120.

The information system 100 may be accessible over the network 120 by advertiser devices, such as an advertiser client device 122 and by audience devices, such as an audience client device 124. An audience device can be a client device that presents online content, such as entity and non-entity search results, search suggestions, content, and advertisements, to a user, and may include both laptop computer 126 and smartphone 128. Entity and non-entity search results can be monetized and/or sponsored, and the sub-GUIs of each can be generated to include call-to-action buttons representing sponsored verbs. In various examples of such an online information system, users may search for and obtain content from sources over the network 120, such as obtaining content from the search engine server 106, the ad server 108, the ad database 110, the content server 112, the content database 114, the modular search framework server 116, and the sponsored search server 117. Advertisers may provide advertisements for placement on electronic properties, such as webpages, and other communications sent over the network to audience devices, such as the audience client device 124. The online information system can be deployed and operated by an online services provider, such as Yahoo! Inc.

The account server 102 stores account information for advertisers. The account server 102 is in data communication with the account database 104. Account information may include database records associated with each respective advertiser. Suitable information may be stored, maintained, updated and read from the account database 104 by the account server 102. Examples include advertiser identification information, advertiser security information, such as passwords and other security credentials, account balance information, and information related to content associated with their ads, and user interactions associated with their ads and associated content. Also, examples include analytics data related to their ads and associated content and user interactions with the aforementioned. In an example, the analytics data may be in the form of one or more sketches, such as in the form of a sketch per audience segment, segment combination, or at least part of a campaign. The account information may include ad booking information. This booking information can be used as input for determining ad impression availability.

The account server 102 may be implemented using a suitable device. The account server 102 may be implemented as a single server, a plurality of servers, or another type of computing device known in the art. Access to the account server 102 can be accomplished through a firewall that protects the account management programs and the account information from external tampering. Additional security may be provided via enhancements to the standard communications protocols, such as Secure HTTP (HTTPS) or the Secure Sockets Layer (SSL). Such security may be applied to any of the servers of FIG. 1, for example.

The account server 102 may provide an advertiser front end to simplify the process of accessing the account information of an advertiser (such as a client-side application). The advertiser front end may be a program, application, or software routine that forms a user interface. In a particular example, the advertiser front end is accessible as a website with electronic properties that an accessing advertiser may view on an advertiser device, such as the advertiser client device 122. The advertiser may view and edit account data and advertisement data, such as ad booking data, using the advertiser front end. After editing the advertising data, the account data may then be saved to the account database 104.

Also, audience analytics, impressions delivered, impression availability, and segments may be viewed in real time using the advertiser front end. The advertiser front end may be a client-side application, such as a client-side application running on the advertiser client device. A script and/or applet (such as a script and/or applet) may be a part of this front end and may render access points for retrieval of the audience analytics, impressions delivered, impression availability, and segments. In an example, this front end may include a graphical display of fields for selecting an audience segment, segment combination, or at least part of a campaign. The front end, via the script and/or applet, can request the audience analytics, impressions delivered, and impression availability for the audience segment, segment combination, or at least part of a campaign. The information can then be displayed, such as displayed according to the script and/or applet.

The search engine server 106, the modular search framework server 116, the sponsored search server 117, or any combination thereof may be one or more servers. Alternatively, the search engine server 106, the modular search framework server 116, the sponsored search server 117, or any combination thereof may be a computer program, instructions, or software code stored on a non-transitory computer-readable storage medium that runs on one or more processors or system circuitry of one or more servers. The search engine server 106, the modular search framework server 116, the sponsored search server 117, or any combination thereof may be accessed by audience devices, such as the audience client device 124 operated by an audience member over the network 120. Access may be through graphical access points. For example, query entry box (such as the query entry boxes 802 and 1102 illustrated in FIGS. 8 and 11) may be an access point for the user to submit a search query to the search engine server 106, the modular search framework server 116, the sponsored search server 117, or any combination thereof, from the audience client device 124. Search queries submitted or other user interactions with such servers can be logged in data logs, and such logs may be communicated to the analytics server 118 for processing. After processing, the analytics server 118 can output corresponding analytics data to be served to the search engine server 106, the modular search framework server 116, the sponsored search server 117, or any combination thereof for determining entity and non-entity non-sponsored search results, entity and non-entity sponsored search results, and other types of content and ad impressions. Analytics circuitry may be used to determine analytics data, and such circuitry may be embedded in any one of the servers and client devices illustrated in FIG. 1.

Besides a search query, the audience client device 124 can communicate interactions with a search result and/or a search suggestion, such as interactions with a sub-GUI or modular component associated with the search result appearing on the same page view as the search result. Such interactions can be communicated to any one of the servers illustrated in FIG. 1, for example. The search engine server 106, the modular search framework server 116, the sponsored search server 117, or any combination thereof can locate information matching the queries and the interactions using a suitable protocol or algorithm and return the matching information to the audience client device 124, such as in the form of search suggestions, monetized and/or sponsored search results, entity search results, non-entity search results, associated GUIs utilizing sponsored verbs, and any combination thereof. An example of non-entity search results can include a list of webpage search results and/or search suggestion results. Webpage search results may include a link to a corresponding webpage and a short corresponding blurb and/or text scraped from the webpage. Search suggestion results may include entity and non-entity search results that are determined to likely be of interest of to the user. The search engine server 106, the modular search framework server 116, the sponsored search server 117, or any combination thereof may receive user interaction information, that can include search queries, from an audience device, and send corresponding information to the ad server 108 and/or the content server 112, and the ad server 108 and/or the content server 112 may serve corresponding ads and/or search results, but with more in-depth details or accompanying GUIs and sub-GUIs for interacting with subject matter associated with ads, entity search results, non-entity search results, sponsored content, or any combination thereof. The information inputted and/or outputted by these devices may be logged in data logs and communicated to the analytics server 118 for processing, over the network 120. The analytics server 118 can provide analyzed feedback for affecting future serving of content. For example, the analytics server 118 can provide feedback for affecting serving of ads, search suggestions, entity search results, non-entity search results, sponsored verbs, and their respective GUIs (such as entity GUIs 701 1101, 1201 of FIGS. 7, 11, and 12, respectively, or non-entity GUIs 801, 1001 of FIGS. 8 and 10, respectively), and sub-GUIs (such as sponsored verb GUIs 810, 1010, 1110,1210 illustrated in FIGS. 8, 10, 11, and 12, respectively) included with and/or associated with the ads, search suggestions, entity search results, and non-entity search results, sponsored verbs, or any combination thereof.

The search engine server 106, the modular search framework server 116, the sponsored search server 117, or any combination thereof may be designed to help users and potential audience members find information located on the Internet or an intranet. In an example, these servers or any combination thereof may also provide to the audience client device 124 over the network 120 an electronic property, such as a webpage and/or entity tray, with content, including search results, ads, information matching the context of a user inquiry, links to other network destinations, or information and files of information of interest to a user operating the audience client device 124, as well as a stream or webpage of content items and advertisement items selected for display to the user. The aforementioned provided properties and information, solely or in any combination, may be monetized and/or sponsored. The aforementioned properties and information provided by these servers or any combination thereof may also be logged, and such logs may be communicated to the analytics server 118 for processing, over the network 120. Once processed into corresponding analytics data, the analytics server 118 can provide analyzed feedback for affecting future serving of content. For example, the analytics server 118 can provide feedback for affecting serving of ads, search suggestions, entity search results, non-entity search results, sponsored verbs, their respective GUIs and sub-GUIs included with and/or associated with the ads, search suggestions, entity search results, and non-entity search results, or any combination thereof.

The search engine server 106, the modular search framework server 116, the sponsored search server 117, or any combination thereof may enable a device, such as the advertiser client device 122, the audience client device 124, or another type of client device, to search for files of interest using a search query, such as files associated with sponsored entity trays. Typically, these servers or any combination thereof may be accessed by a client device over the network 120. These servers or any combination thereof may include a crawler component, an indexer component, an index storage component, a search component, a ranking component, a cache, a user or group profile storage component, an entity storage component, a logon component, a user or group profile builder, an entity builder, and application program interfaces (APIs), such as APIs corresponding with the modular search framework. These servers or any combination thereof may be deployed in a distributed manner, such as via a set of distributed servers, for example. Components may be duplicated within a network, such as for redundancy or better access.

The ad server 108 operates to serve advertisements to audience devices, such as the audience client device 124. An advertisement may include text data, graphic data, image data, video data, or audio data. Advertisements may also include data defining advertisement information that may be of interest to a user of an audience device. The advertisements may also include respective audience targeting information or ad campaign information, such as information on audience segments and segment combinations. An advertisement may further include data defining links to other online properties reachable through the network 120, such as to sponsored and non-sponsored entity trays. Also, entity GUIs and other types of properties (such as sponsored entity trays and sub-GUIs related to those trays) may be or include an advertisement or GUI generated for displaying a call-to-action button associated with a sponsored verb. The aforementioned audience targeting information and the other data associated with an ad may be logged in data logs and such logs may be communicated to the analytics server 118 for processing. Once processed into corresponding analytics data, the analytics server 118 can provide analyzed feedback for affecting future serving of content, such as monetized and/or sponsored content, including sponsored verbs and/or contexts. For example, the analytics server 118 can provide feedback for affecting serving of ads, search suggestions, entity search results, non-entity search results, sponsored verbs, respective GUIs and sub-GUIs included with and/or associated with the ads, search suggestions, entity search results, and non-entity search results, and any combination thereof.

For online service providers, advertisements may be displayed on electronic properties resulting from a user-defined search based, at least in part, upon search terms. Advertising may be beneficial to users, advertisers or web portals if displayed advertisements are relevant to audience segments, segment combinations, or at least parts of campaigns. Thus, a variety of techniques have been developed to determine corresponding audience segments or to subsequently target relevant advertising to audience members of such segments. For example user interests, user intentions, and targeting data related to segments or campaigns may be may be logged in data logs and such logs may be communicated to the analytics server 118 for processing. Once processed into corresponding analytics data, the analytics server 118 can provide analyzed feedback for affecting future serving of content.

One approach to presenting targeted advertisements includes employing demographic characteristics (such as age, income, sex, occupation, etc.) for predicting user behavior, such as by group. Advertisements may be presented to users in a targeted audience based, at least in part, upon predicted user behavior. The aforementioned targeting data, such as demographic data and psychographic data, may be logged in data logs and such logs may be communicated to the analytics server 118 for processing. Once processed into corresponding analytics data, the analytics server 118 can provide analyzed feedback for affecting future serving of content.

Another approach includes profile-type ad targeting. In this approach, user or group profiles specific to a respective user or group may be generated to model user behavior, for example, by tracking a user's path through a website or network of sites, and compiling a profile based, at least in part, on entity GUIs (such as entity trays), webpages, and advertisements ultimately delivered. A correlation may be identified, such as for user purchases, for example. An identified correlation may be used to target potential purchasers by targeting content or advertisements to particular users. The aforementioned profile-type targeting data may be logged in data logs and such logs may be communicated to the analytics server 118 for processing. Once processed into corresponding analytics data, the analytics server 118 can provide analyzed feedback for affecting future serving of content.

Yet another approach includes targeting based on content of an electronic property requested by a user, such as content of an entity GUI (such as an entity tray) or webpage requested by a user. Advertisements may be placed on an electronic property or in association with other content that is related to the subject of the advertisements. The relationship between the content and the advertisement may be determined in a suitable manner. The overall theme of a particular electronic property may be ascertained, for example, by analyzing the content presented therein. Moreover, techniques have been developed for displaying advertisements geared to the particular section of the article currently being viewed by the user. Accordingly, an advertisement may be selected by matching keywords, and/or phrases within the advertisement and the electronic property. The aforementioned targeting data may be logged in data logs and such logs may be communicated to the analytics server 118 for processing. Once processed into corresponding analytics data, the analytics server 118 can provide analyzed feedback for affecting future serving of content.

The ad server 108 includes logic and data operative to format the advertisement data for communication to a user device, such as an audience member device. The ad server 108 is in data communication with the ad database 110. The ad database 110 stores information, including data defining advertisements, to be served to user devices. This advertisement data may be stored in the ad database 110 by another data processing device or by an advertiser. The advertising data may include data defining advertisement creatives and bid amounts for respective advertisements and/or audience segments. The aforementioned ad formatting and pricing data may be logged in data logs and such logs may be communicated to the analytics server 118 for processing. Once processed into corresponding analytics data, the analytics server 118 can provide analyzed feedback for affecting future serving of content.

The advertising data may be formatted to an advertising item that may be included in a stream of content items and advertising items provided to an audience device. The formatted advertising items can be specified by appearance, size, shape, text formatting, graphics formatting and included information, which may be standardized to provide a consistent look and feel for advertising items in the stream. Such a stream may be included in or combined with an entity GUI (such as an entity tray). Also, a related entity GUI can include a similar appearance, size, shape, text formatting, graphics formatting and included information to provide a consistent look and feel between the entity GUI and the stream. Also, sponsored entity GUIs and sub-GUIs, opposed to non-sponsored entity GUIs and sub-GUIs, can include a similar appearance, size, shape, text formatting, graphics formatting, or combination thereof to provide a consistent look and feel between each other and/or a sponsored stream. Additionally, data related to the aforementioned formatting may be logged in data logs and such logs may be communicated to the analytics server 118 for processing. Once processed into corresponding analytics data, the analytics server 118 can provide analyzed feedback for affecting future serving of content.

Further, the ad server 108 is in data communication with the network 120. The ad server 108 communicates ad data and other information to devices over the network 120. This information may include advertisement data communicated to an audience device. This information may also include advertisement data and other information communicated with an advertiser device, such as the advertiser client device 122. An advertiser operating an advertiser device may access the ad server 108 over the network to access information, including advertisement data. This access may include developing advertisement creatives, editing advertisement data, deleting advertisement data, setting and adjusting bid amounts and other activities. This access may also include a portal for interacting with, viewing analytics associated with, and editing parts of entity GUIs (such as entity trays) the advertiser at least partially controls or owns. The ad server 108 then provides the ad items and/or entity GUIs to other network devices, such as the modular search framework server 116, the analytics server 118, and/or the account server 102, for classification (such as associating the ad items and/or entity GUIs with audience segments, segment combinations, or at least parts of campaigns). This information can be used to provide feedback for affecting serving of ads, search suggestions, entity search results, non-entity search results, respective GUIs and sub-GUIs included with and/or associated with the ads, search suggestions, entity search results, and non-entity search results, or any combination thereof.

The ad server 108 may provide an advertiser front end to simplify the process of accessing the advertising data of an advertiser. The advertiser front end may be a program, application or software routine that forms a user interface. In one particular example, the advertiser front end is accessible as a website with electronic properties that an accessing advertiser may view on the advertiser device. The advertiser may view and edit advertising data using the advertiser front end. After editing the advertising data, the advertising data may then be saved to the ad database 110 for subsequent communication in advertisements to an audience device.

The ad server 108, the content server 112, or any other server described herein may be one or more servers. Alternatively, the ad server 108, the content server 112, or any other server described herein may be a computer program, instructions, and/or software code stored on a non-transitory computer-readable storage medium that runs on one or more processors of one or more servers. The ad server 108 may access information about ad items either from the ad database 110 or from another location accessible over the network 120. The ad server 108 communicates data defining ad items and other information to devices over the network 120. The content server 112 may access information about content items either from the content database 114 or from another location accessible over the network 120. The content server 112 communicates data defining content items and other information to devices over the network 120. Content items and the ad items may include any form of content included in ads, search suggestions, entity search results, non-entity search results, respective GUIs and sub-GUIs included with and/or associated with the ads, search suggestions, entity search results, and non-entity search results, or any combination thereof.

The information about content items may also include content data and other information communicated by a content provider operating a content provider device, such as respective audience segment information and possible links to entity search results, trays, and other types of entity GUIs. A content provider operating a content provider device may access the content server 112 over the network 120 to access information, including the respective segment information, entity search result information, and entity GUI information. This access may be for developing content items, editing content items, deleting content items, setting and adjusting bid amounts and other activities, such as associating content items with audience segments, segment combinations, or at least parts of campaigns. A content provider operating a content provider device may also access the analytics server 118 over the network 120 to access analytics data. Such analytics may help focus developing content items, editing content items, deleting content items, setting and adjusting bid amounts, and activities related to distribution of the content, such as distribution of content via monetized and sponsored entity search results and GUIs (such as monetized and sponsored entity trays including call-to-action GUIs associated with sponsored verbs).

The content server 112 may provide a content provider front end to simplify the process of accessing the content data of a content provider. The content provider front end may be a program, application or software routine that forms a user interface. In a particular example, the content provider front end is accessible as a website with electronic properties that an accessing content provider may view on the content provider device. The content provider may view and edit content data using the content provider front end. After editing the content data, such as at the content server 112 or another source of content, the content data may then be saved to the content database 114 for subsequent communication to other devices in the network 120, such as devices administering monetized and sponsored entity search results and GUIs.

The content provider front end may be a client-side application, such as a client-side application running on the advertiser client device or the audience client device, respectively. A script and/or applet, such as the script and/or applet, may be a part of this front end and may render access points for retrieval of impression availability data (such as the impression availability data), and the script and/or applet may manage the retrieval of the impression availability data. In an example, this front end may include a graphical display of fields for selecting audience segments, segment combinations, or at least parts of campaigns. Then this front end, via the script and/or applet, can request the impression availability for the audience segments, segment combinations, or at least parts of campaigns. The analytics can then be displayed, such as displayed according to the script and/or applet. Such analytics may also be used to provide feedback for affecting serving of ads, search suggestions, entity search results, non-entity search results, respective GUIs and sub-GUIs included with and/or associated with the ads, search suggestions, entity search results, and non-entity search results, and any combination thereof.

The content server 112 includes logic and data operative to format content data for communication to the audience device. The content server 112 can provide content items or links to such items to the analytics server 118 and/or the modular search framework server 116 for analysis or associations with entities, respectively. For example, content items and links may be matched to data and circuitry, such as entity data and circuitry and even module circuitry and data (e.g., module circuitry 910 in FIG. 9). The matching may be complex and may be based on historical information related to the audience segments and impression availability.

The content data may be formatted to a content item that may be included in a stream of content items and advertisement items provided to an audience device. The formatted content items can be specified by appearance, size, shape, text formatting, graphics formatting and included information, which may be standardized to provide a consistent look and feel for content items in the stream. Such a stream may be included in or combined with an entity GUI (such as an entity tray). Also, a related entity GUI can include a similar appearance, size, shape, text formatting, graphics formatting and included information to provide a consistent look and feel between the entity GUI and the stream. Additionally, aforementioned formatting data may be logged in data logs and such logs may be communicated to the analytics server 118 for processing. Once processed into corresponding analytics data, the analytics server 118 can provide analyzed feedback for affecting future serving of content.

In an example, the content items may have an associated bid amount that may be used for ranking or positioning the content items in a stream of items presented to an audience device. In other examples, the content items do not include a bid amount, or the bid amount is not used for ranking the content items. Such content items may be considered non-revenue generating items. The bid amounts and other related information may be logged in data logs and such logs may be communicated to the analytics server 118 for processing. Once processed into corresponding analytics data, the analytics server 118 can provide analyzed feedback for affecting future serving of content.

The aforementioned servers and databases may be implemented through a computing device. A computing device may be capable of sending or receiving signals, such as over a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally, a server may include a central processing unit and memory. A server may also include a mass storage device, a power supply, wired and wireless network interfaces, input/output interfaces, and/or an operating system, such as Windows Server, Mac OS X, UNIX, Linux, FreeBSD, or the like.

The aforementioned servers and databases may be implemented as online server systems or may be in communication with online server systems. An online server system may include a device that includes a configuration to provide data via a network to another device including in response to received requests for page views, entity search results and GUIs (such as entity trays), or other forms of content delivery. An online server system may, for example, host a site, such as a social networking site, examples of which may include, without limitation, Flicker, Twitter, Facebook, LinkedIn, or a personal user site (such as a blog, vlog, online dating site, etc.). Such sites may be integrated with the framework via the modular search framework server 116. An online server system may also host a variety of other sites, including, but not limited to business sites, educational sites, dictionary sites, encyclopedia sites, wikis, financial sites, government sites, etc. These sites, as well, may be integrated with the framework via the modular search framework server 116.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 120 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, may employ differing architectures or may be compliant or compatible with differing protocols, and may interoperate within a larger network, such as the network 120.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

The advertiser client device 122 includes a data processing device that may access the information system 100 over the network 120. The advertiser client device 122 is operative to interact over the network 120 with any of the servers or databases described herein. The advertiser client device 122 may implement a client-side application for viewing electronic properties and submitting user requests. The advertiser client device 122 may communicate data to the information system 100, including data defining electronic properties and other information. The advertiser client device 122 may receive communications from the information system 100, including data defining electronic properties and advertising creatives. The aforementioned interactions and information may be logged in data logs and such logs may be communicated to the analytics server 118 for processing. Once processed into corresponding analytics data, the analytics server 118 can provide analyzed feedback for affecting future serving of content.

In an example, content providers may access the information system 100 with content provider devices that are generally analogous to the advertiser devices in structure and function. The content provider devices provide access to content data in the content database 114, for example.

The audience client device 124 includes a data processing device that may access the information system 100 over the network 120. The audience client device 124 is operative to interact over the network 120 with the search engine server 106, the ad server 108, the content server 112, and the analytics server 118, and the modular search framework server 116. The audience client device 124 may implement a client-side application for viewing electronic content and submitting user requests. A user operating the audience client device 124 may enter a search request and communicate the search request to the information system 100. The search request is processed by the search engine and search results are returned to the audience client device 124. The aforementioned interactions and information may be logged in data logs and such logs may be communicated to the analytics server 118 for processing. Once processed into corresponding analytics data, the analytics server 118 can provide analyzed feedback for affecting future serving of content.

In other examples, a user of the audience client device 124 may request data, such as a page of information from the online information system 100. The data instead may be provided in another environment, such as a native mobile application, TV application, or an audio application. The online information system 100 may provide the data or re-direct the browser to another source of the data. In addition, the ad server may select advertisements from the ad database 110 and include data defining the advertisements in the provided data to the audience client device 124. The aforementioned interactions and information may be logged in data logs and such logs may be communicated to the analytics server 118 for processing. Once processed into corresponding analytics data, the analytics server 118 can provide analyzed feedback for affecting future serving of content.

The advertiser client device 122 and the audience client device 124 operate as a client device when accessing information on the information system 100. A client device, such as the advertiser client device 122 and the audience client device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the foregoing devices, or the like. In the example of FIG. 1, both laptop computer 126 and smartphone 128, which can be client devices or audience devices, may be operated as either an advertiser device or an audience device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include a physical or virtual keyboard, mass storage, an accelerometer, a gyroscope, a global positioning system (GPS) or other location-identifying type capability, or a display with a high degree of functionality, such as a touch-sensitive color 2D or 3D display, for example.

A client device, such as the advertiser client device 122 and the audience client device 124, may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally or remotely stored or streamed video, or video games. The foregoing is provided to illustrate that claimed subject matter is intended to include a wide range of possible features or capabilities. At least some of the features, capabilities, and interactions with the aforementioned may be logged in data logs and such logs may be communicated to the analytics server 118 for processing. Once processed into corresponding analytics data, the analytics server 118 can provide analyzed feedback for affecting future serving of content. Also, the described methods and systems may be implemented at least partially in a cloud-computing environment, at least partially in a server, at least partially in a client device, or in any combination thereof.

Figure 2:
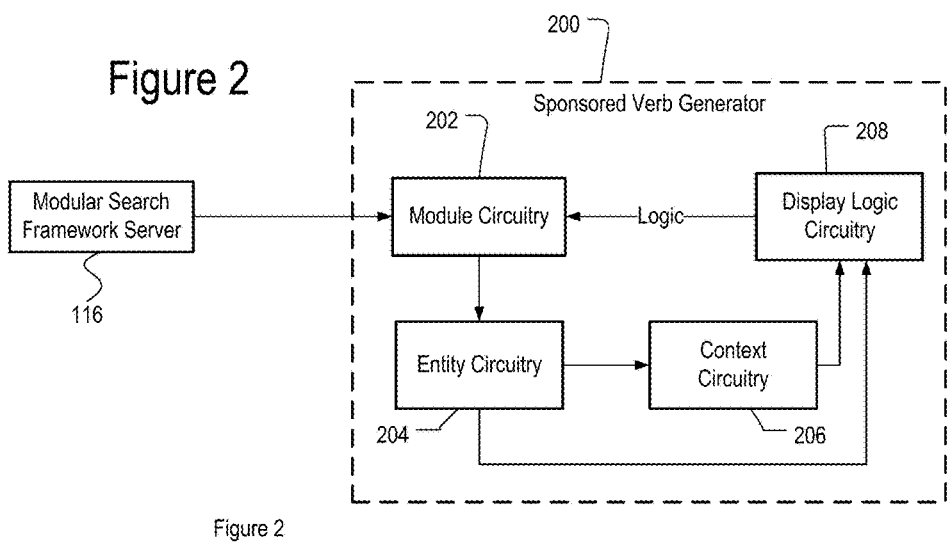
FIG. 2 illustrates a block diagram of one embodiment of sponsored verb generating circuitry.

FIG. 2 illustrates a block diagram of circuitry components of a sponsored verb generator according to some embodiments. Sponsored verb generator 200 may be communicatively coupled modular search framework server 116 and may include module circuitry 202, entity circuitry 204, context circuitry 206, and/or display logic circuitry 208 components. Modular search framework server 116 may receive a search query to from a user device and determine one or more entity and/or non-entity search results. For each entity and/or non-entity search results, modular search framework server 116 may seek to identify opportunities for monetization, including by generating GUI elements for call-to-action buttons associated with sponsored verbs. Modular search framework server 116 will communicate the quests for each entity and non-entity search result to sponsored verb generator 200. The request will be received by sponsored verb generator 200 and module circuitry 202 will determine one or modular components associated with each request. The modular components may include one or more sub-GUIs that are generated by or associated with modular circuitry, such as modular circuitry 1310 described in connection with FIG. 13.

The modular circuitry components (e.g., summary circuitry, tray circuitry, maps circuitry, entity circuitry) will dynamically generate content to fill each of the sub-GUI components. The respective sub-GUI that are generated and displayed by the system can be dynamically determined or modified based on a context or intent associated with the search query. Module circuitry 202 will communicate the information for each sub-GUI to entity circuitry 204, which will assemble the information of the sub-GUIs or modular components for each or non-entity search result. In some embodiments, the relevant information for the modular components will be communicated to context circuitry 206 in order to identify one or more contexts and/or intents associated with the search query or the user device that communicated the search query to modular search framework server 116. If a context is identified, the content for each of the modular components can be dynamically adapted or modified based on the identified context or intent. The modular component information, including any dynamically modified or generated content, is then communicated to display logic circuitry 208 in order to generate display logic for displaying the dynamically generated information as graphical elements on the root GUI and sub-GUIs. The graphical elements displayed as portions of the root GUI and sub-GUIs will include any dynamically generated call-to-action buttons associated with a sponsored verb.

Figure 12:
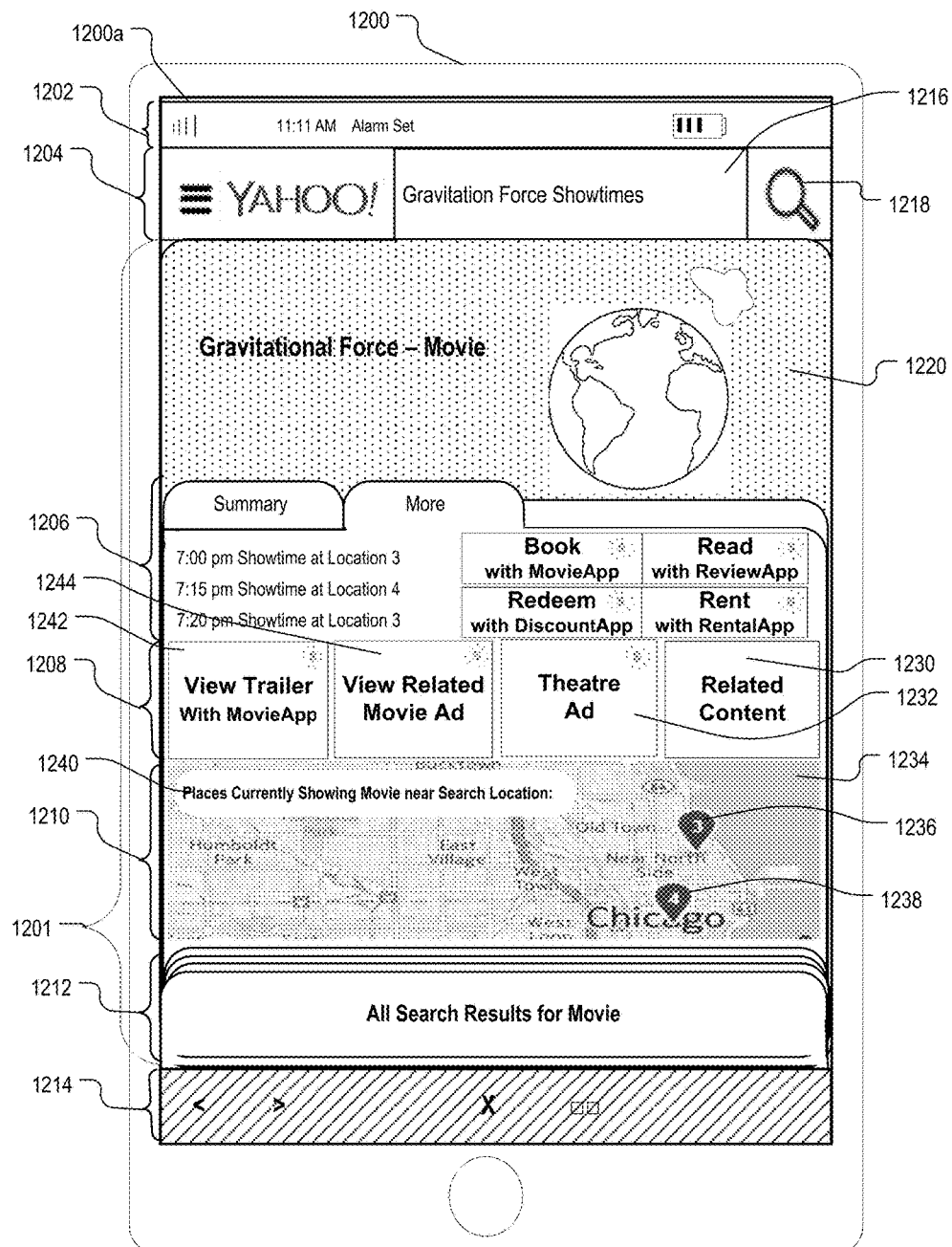
FIG. 12 illustrates an exemplary mobile search result for a second entity generated by the modular search object framework and utilizing sponsored verbs according to one embodiment.

As will be appreciated by those skilled in the art, for graphical search results generated according to this embodiment, a search query that is targeting the same entity or non-entity result can appear differently to two different users. For example, as shown in FIG. 12, a user may execute a search query seeking information on the entity search result for "Gravitational Force" movie. An intent may be determined that the user is looking for showtimes for the movie and a context may be determined that the user is located in Chicago, Ill. The entity search results for this user will be dynamically generated to display show times in one sub-GUI based on the context. Additionally, call-to-action actions buttons and dynamic content shown in sponsored verb GUIs 1210 that are generated may likewise take into consideration both the intent and context.

Figure 3:
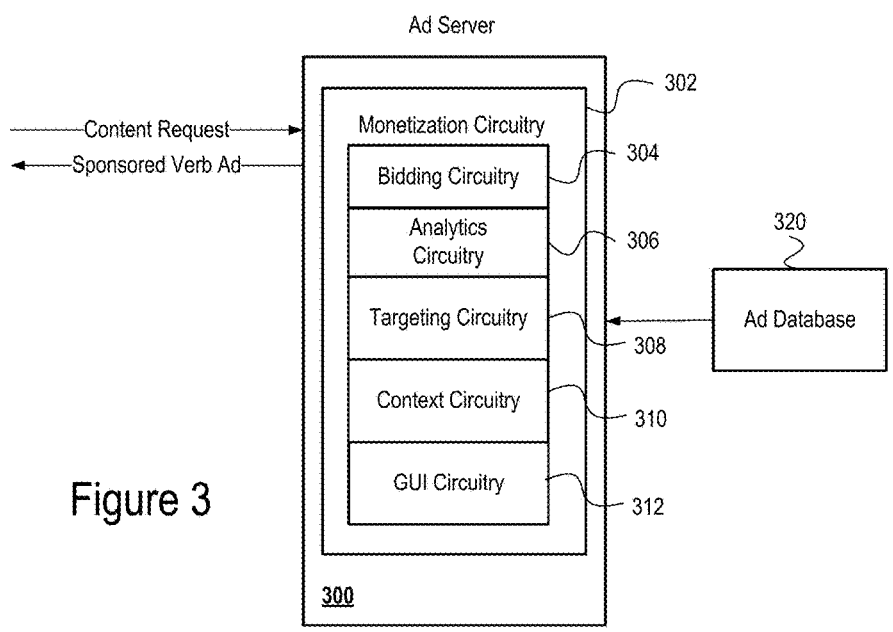
FIG. 3 illustrates a block diagram of one embodiment of exemplary monetization circuitry of an ad server.

FIG. 3 illustrates a block diagram of exemplary monetization circuitry of an ad server according to some embodiments, including monetization circuitry that may be utilized in connection with sponsored verbs. An ad server 300 (which may be the same server as ad server 118 or modular search framework server 116, or a separate server communicatively coupled to ad server 118 or modular search framework server 116 over a network) may include monetization circuitry 302 for monetizing graphical search results associated with entity and non-entity results. Monetization circuitry 302 may include component circuitry consisting of one or more of bidding circuitry 304, analytics circuitry 306, targeting circuitry 308, context circuitry 310, and GUI circuitry 312. Monetization circuitry 302 is in communication with ad database 320, which may be the same database as ad database 110, content database 114, account database 104, or analytics database 119, or be in communication with one or more of these databases over a network, such as network 120.

Figure 9:
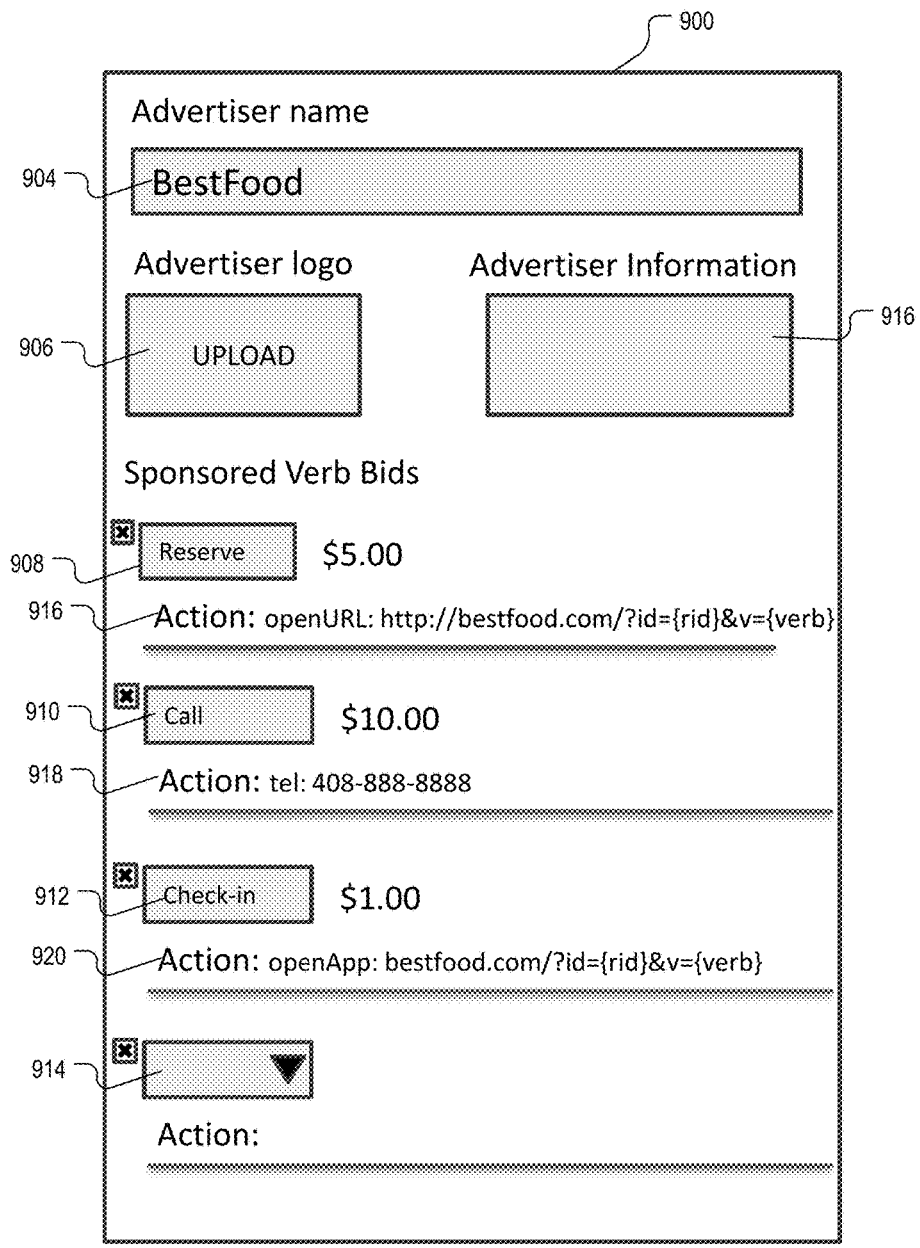
FIG. 9 illustrates an exemplary interface for receiving advertiser bids and specifications for generating advertisements utilizing sponsored verb campaigns according to one embodiment.

Ad server 300 may provide a GUI accessible over the network that allows an advertiser to access the server and to create advertising campaigns, as described further in connection with the embodiment described in FIG. 9, for example. The server interface may include graphical elements generated by GUI circuitry 312 that allow the advertiser to specific campaign parameters, including advertiser information, campaign information, targeting criteria, bid amounts, sponsored verbs, and responsive actions for each call-to-action button associated with the sponsored verb, as any other function associated with creating an advertising campaign in accordance with the present description. An advertisers can include the owner of the entity or product featured in an entity or non-entity search result, owners or aggregators that want to drive user visits to their sites (which may be related to other entities), developers of content, such as smart phone applications, service providers, and any other entity that may wish to be associated with a sponsored verb and a call-to-action button displayed as a portion of a graphical search result.

Any of these advertisers may access ad server 300 and generate an advertisement campaign. The ad campaigns will be stored in ad database 320 and accessible by ad server 300. During generation of a call-to-action button for a sponsored verb displayed as a portion of a graphical search result in response to a search query, the content request will be communicated to ad server 300. Monetization circuitry 302 will process the content request to select which ad campaign is most relevant to the content request. This may include context circuitry 310 determining one or more contexts and/or intents associated with the content request and analytics circuitry 306 selecting the most relevant ad campaign for each context. Importantly, there may be multiple entity and non-entity search results that are included in the content request, and each entity and non-entity search result may have multiple sub-GUIs or modular components that may be monetized by the system.

For each of the sub-GUIs and modular components, monetization circuitry 302 can select multiple bids from the advertisement campaigns in ad database 320 and generate GUI elements for call-to-action button associated with sponsored verbs from the advertisement campaigns. Bidding circuitry 304 collects all of the bids for sponsored verbs that may be relevant to entity and non-entity search results that are included in the content request. Context circuitry 310 then determines one or more contexts and/or intents associated with the content request. Targeting circuitry 308 then determines which sponsored verbs are most relevant to entity and non-entity search results, including taking into account any contexts or intents associated with the content request. Targeting circuitry 308 may utilize a number of algorithmic techniques in order to assess the relevance of the search results to the query keywords and to the contexts or intents associated with the content request. For example, machine learning can be used to determine predicted information and information desired by the user to be displayed anywhere on an entity GUI. Such information can be determined according to historical online user interaction data that can include data pertaining to clicks, searches, dwell times, or any combination thereof. Respective module circuitry associated with such predictions may include respective specific circuitry for predictions with related to sponsored content and non-sponsored content.

Targeting circuitry 308 may also communicate with analytics circuitry 306 to process historical data related to historical user interactions with content, such as click through rate, bounce rate, or any of the targeting data described in connection with FIG. 1. Once targeting circuitry 308 identifies all the most relevant sponsored verbs, bidding circuitry 304 will consider the bid amounts for each of the relevant sponsored verbs and select the winning bids, which may be the highest bid for the relevant sponsored verbs.

As mentioned, ad server 300 may identify multiple sub-GUI or modular components for a graphical search result, and therefore, identify multiple intents and contexts for each card. This will in turn allow the system to popular a single entity search result with several call-to-action buttons associated with sponsored verbs, as shown in sponsored verb GUIs 810, 1010, and 1110, of FIGS. 8, 10, and 11, respectively. In this case, all of the ads which match the targeting data (including the intents and contexts) for each sponsored verb GUIs are bidded against each other, and a separate auction can be held for each of the sponsored verb GUIs. For example, if someone searches for "hotels las vegas," the system may add a GUI element let the user select their check in and check out dates and this can be identified as an additional context. The system can consider bids for the entity result, but take into account which bids have specified targeting criteria relevant to the context. Thus, each action verb will be auctioned by evaluating combined factors considering the bid amount and ultimate user experience. User experience considers relevance (between the verb and responsive action defined by the advertiser that takes place when the user clicks the sponsored verb GUI), device characteristics, including installed apps, for example, and historical data of user behaviors. Further, in some embodiments, instead of directly triggering a responsive action, the GUI elements associated with sponsored verbs may trigger a drop down menu or hierarchical interface overlay of multiple, related interactive interface elements that are associated with the sponsored verb. Each of these individual interface elements may be sponsored by individual advertisers and may be bid on or separately monetized using multiple auctions. The set of verbs triggered to display in the overlay menu may all be related, or variations of the same sponsored verb that is displayed as part of the primary GUI element.

Advertisers may choose to have very targeted advertisement campaigns and bids, such that they are very likely to be displayed in highly targeted scenarios, or advertisers may choose to leave out of part of a verb context in order to bid against larger sets of ads. Ad bids are matched based on partial context whenever a particular context is omitted. For example, if the content request is hotels in San Jose and a context is for the date of June 22, the system may match a partial context of hotels in San Jose only, hotels with check in on June 22 only, or hotels generally. If the user searches for a particular hotel in San Jose, then the entity associated with the particular hotel may be used for bid matching along with the partial contexts.

Further, additional contexts may be identified for a particular query, such as user demographics, profile traits, or search history, and a partial contexts for these additional contexts may be matched to further sets of ads. The additional contexts specified by an advertiser are represented through a semi-structured system text system. In this way, contexts are a logical extension to keywords and historical advertisement campaigns can be parsed to generate contexts for each advertisement campaign, thereby allowing it the historical ad campaign to be used in accordance with the present description. Given this set up, advertisers that choose to bid on a very specific context may therefore place a higher bid for when a user matches a more specific context because there is a higher likelihood that the ad will match the user's interest at that moment. Alternatively, advertisers can choose to bid on a less specific context and be matched a larger pool of potential advertisements. Advertisements matching more specific ads may have a higher revenue-per click ("RPC").

In another aspect of monetization, entities, such as local businesses, can claim their listing and then pay to promote their content when a user searches for their entity or related entities. National businesses can likewise associate their advertisement campaigns with particular geographic locations as well their business entity name. Location may be determined as a context by the IP address or location of the user's mobile device, or from parsing the query itself (or a combination of both—e.g., a search including a city name). This allows national entities to tailor their geographic-specific advertisements to be dynamic and context aware.

Figure 4:
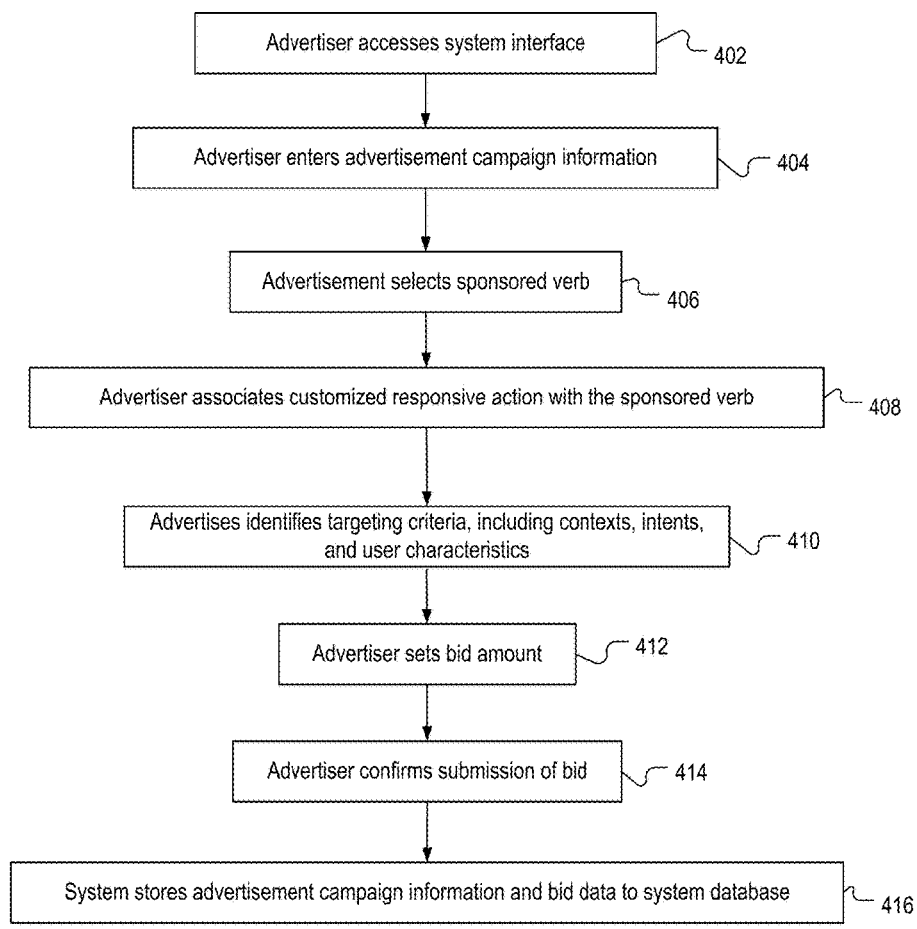
FIG. 4 illustrates exemplary operations according to one embodiment that may be performed by the circuitry of an ad server and/or a client-side application of an advertiser in an exemplary system in order to generate an ad campaign using sponsored verbs.

FIG. 4 illustrates exemplary operations that may be performed by the circuitry of an ad server and/or a client-side application of an advertiser in an exemplary system in order to generate an ad campaign using sponsored verbs according to one embodiment. At block 402, the advertiser accesses the system interface of the ad server, which allows advertisers to access the sponsored verb marketplace, as described further in connection with FIG. 3. At block 404, the advertiser uses the system GUIs to enter information associated with a new advertisement campaign. The campaign information include the advertisement name, a logo associated with the advertisement, and information about the advertiser, such as the business details and categories of products sold. This information may be parsed by the system when determining relevancy of the advertisement campaign to the content request. Additionally, in some embodiments, hierarchical or other structured GUI elements may be provided to allow the user to specify relevant categories. In other embodiments, the user interface may be implemented similar those used to specify search filters, or categories may be tags entered as text or built through the user interface.

At block 406, the advertiser selects one or more sponsored verbs to associate their campaign with. The sponsored verbs may include verbs associated with user actions, such as "send" (SMS or email message), "call" (a phone number), "reserve" (a table), "book" (a ticket or reservation), "route" (directions), "ride" (a taxi), "read" (a review), "rent" (a movie or DVD), "order" (takeout), "check-in" (to a social network), "print" (a coupon), "redeem" (credit card points for the product), "check-in" (to a hotel), "buy" (a product), "pay," "review," "share" (a photo), "save" (an offer), "redeem" (a coupon), and "more" or "view" (additional information). However, these examples are non-limiting examples, and the system may allow an advertiser to target any number of interface elements that are associated with a user action. Further, verbs having a hierarchical relationship (e.g., genus to species) to the selected verb may be considered for verb matching as well, such as "route" (drive), "ride" (public transit), and "ride" (taxi), may all be considered when the verb "navigate" is determined to be relevant. At block 408, the associates a custom responsive action with each of the selected sponsored verbs. For each of the individual verbs or actions bid on, the advertiser set a different responsive action that takes place when the user clicks on or selects the call-to-action button and the GUI element associated with the sponsored verb. Exemplary responsive actions may include deep linking to an application installed on the user device, deep linking to a particular feature of that application, installing an application on the user device or linking to an application store where the application is available for download, redirecting to a particular website associated with the verb or action word, redirecting to a mobile browser, or utilizing one of the device features to execute a task (such as calling a number, sending a SMS message, pulling up navigation directions, etc.), although those of skill in the art will appreciate that numerous responsive actions may be specified by the advertiser without exceeding the scope of the present description.

At block 410, the advertiser identifies any targeting criteria for the particular advertisement campaigns. As previously mentioned, targeting criteria may include, among other things, user demographics, historical data, or particular contexts or intents that the advertiser wishes to target. As a general matter, the more specific the targeting criteria specified for a particular campaign the more valuable each presentation of the ad or ad impression will likely be. At bock 412, the advertiser specifies the bid amount for each of the sponsored verbs. As mentioned, although the advertiser can specific any amount they desire, the advertiser may specify a higher amount for very targeted ads, or a lower amount for generic ads. The system (such as the analytics circuitry in communication with the ad database) may also provide feedback information to the advertiser regarding the average historical bid rate for a particular set of targeting criteria. At block 414, the advertiser confirms submission of the bid and the system stores the bid data as part of an advertisement campaign information in the system databases at block 416.

Figure 5:
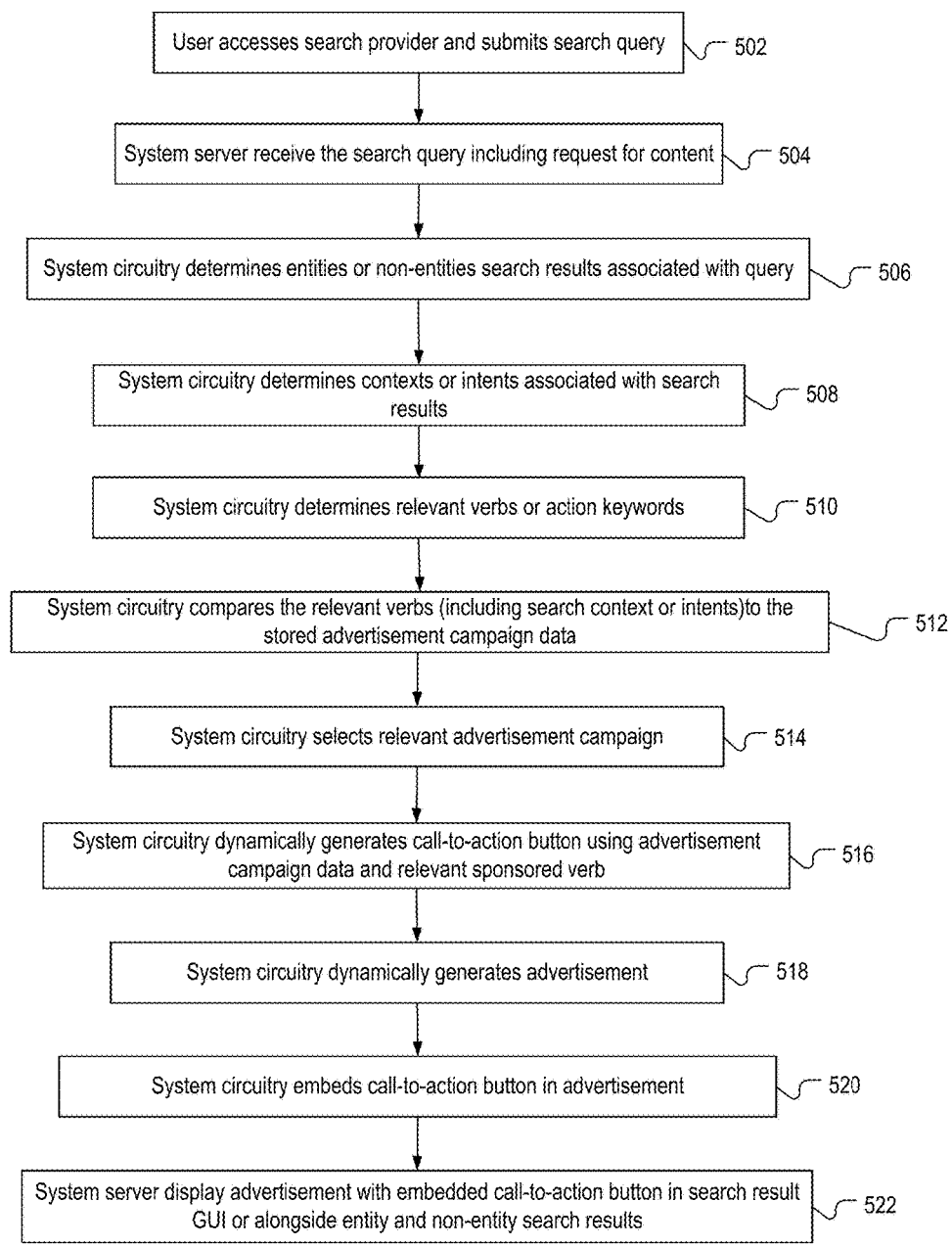
FIG. 5 illustrates exemplary operations according to one embodiment that may be performed by the circuitry of an ad server and/or a client-side application of a user in an exemplary system in order to generate entity and non-entity results utilizing sponsored verbs and contexts for monetization.

FIG. 5 illustrates exemplary operations that may be performed by the circuitry of an ad server and/or a client-side application of a user in an exemplary system in order to generate entity and non-entity results utilizing sponsored verbs and contexts for monetization according to some embodiments. At block 502, a user accesses the content page of a search provider and submits a search query. At block 504, the search query is received by the search server (e.g., modular search framework server 116 or ad server 300, or by a server in operative communication with one or both). The search query includes a request for content. At block 506, the system circuitry processes the search query and request for content in order to determine entity and non-entity search results related to the search query. For example, the system circuitry processing the search query may include one or more of the module circuitry components discussed in connection with FIG. 13, such as processor circuitry 1302, entity search result circuitry 1322, search suggestion circuitry 1324, or webpage search result circuitry 1326, as well as other circuit components. At block, 508 the system circuitry determines one or more contexts or intents associated with all or some of the entity and non-entity search results. Relevant contexts may be determined by a number of circuit components, including, for example, analytics circuitry 306, targeting circuitry 308, and context circuitry 310 discussed in connection with FIG. 3, as well as based on data retrieved from or more device features, such as the accelerometer (e.g., that the device is moving), the gyroscope, the GPS (e.g., the city, state, zip, or other geographic location of the device), Bluetooth, WiFi (e.g., that WiFi is connected and available for more data intensive advertisements), and so forth.

At block 510, the system circuitry (e.g., analytics circuitry and other monetization circuitry components) determines relevant verbs or action keywords associated entity and non-entity search results. In some embodiments, the system may take into account the any of the identified intents or contexts related to the search query and determine which verbs and actions are most likely to be relevant to the user's interests at that particular moment. At block 512, the system circuitry compares the verbs identified to be most relevant for the search query to the stored data for the advertisement campaigns. At block 514, the system circuitry selects the most relevant advertisement campaign for each of the entity or non-entity search results (and an individual sub-GUI components that are associated with a particular intent or context) to be used for monetization. As discussed further in connection with FIG. 3, the system may utilize a number of factors, but may primarily consider bid value, historical targeting data for the particular verb (such as the click through rates for the different verb action), and the relevance of the responsive actions specified by the advertisers to the particular context identified for search result (e.g., bounce rate or percentage of visitors who are served the site in response to the action, but then leave without taking further action).

At block 516, the system circuitry dynamically generates a call-to-action button representing the selected sponsored verbs. The call-to-action button can be dynamically generated to reflect one or more aspects of the context or intent that was determined for the search query. For example, if a user is searching for a particular restaurant located near user, the entity based graphical search result may display numerous modules of information associated with that entity. Each of these module or sub-GUIs can include a dynamically generated call-to-action button representing a responsive verb, and may be modified to consider the context (e.g., time, location) or intent (e.g., to book a table, to view the menu) to reflect those contexts and intents. Thus, the resulting call-to-action button for the sponsored verb "View Menu" may link to a dinner menu if a context is specified that the time is after 4:00 P.M., for example, or may link to a specials menu highlighting the food specials for that day (e.g., when one of the contexts specified is the day of the week). At block 518, the system circuitry dynamically generates the advertisement containing the call-to-action button. In some embodiments, the advertisement may consist wholly of the call-to-action button itself, or the call-to-action button may form a sub-portion of an advertisement created by the advertiser and specified as part of the campaign data. At block 520, the call-to-action button is embedded in the GUI for modular object. At block 522, the advertisement (which may be the call-to-action button itself in some embodiments) is displayed as a portion of the entity or non-entity search result (e.g., as a portion of the root GUI or as a portion of one of the sub-GUIs). The advertisement may also be embedded alongside any of the entity and non-entity search results. In some embodiments, the call-to-action button may also be in the form of a drop menu or trigger that displays an overlay or hierarchical menu of related sponsored verbs. Each sponsored verb may be associated with the same intent or context, and each may correspond to a separate winning auction (i.e., sponsored by a different advertiser or the same advertiser winning more than one auction for the same verb).

Figure 6:
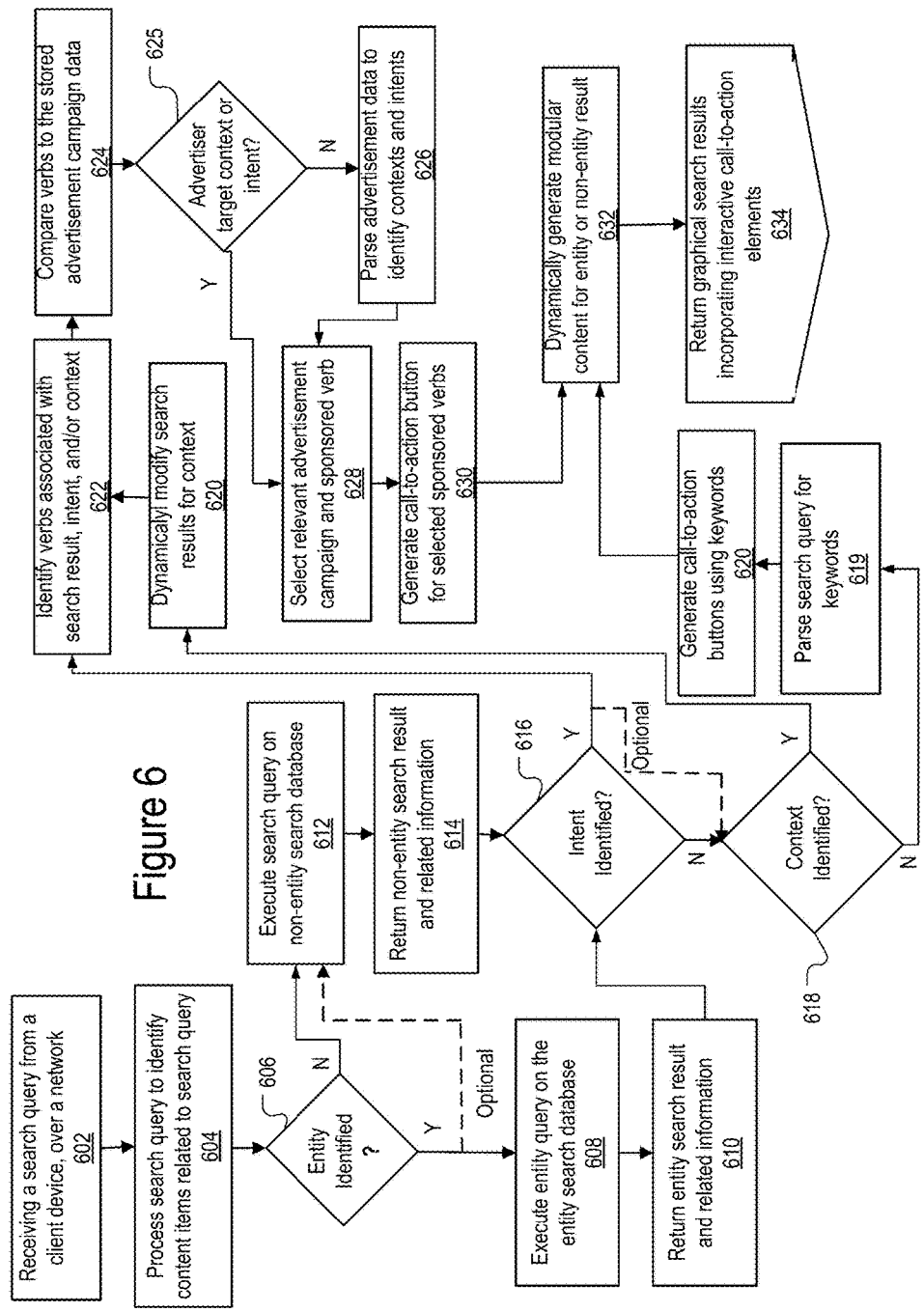
FIG. 6 illustrates exemplary operations according to an additional embodiment that may be performed by the circuitry of an ad server and/or a client-side application of a user in an exemplary system in order to generate entity and non-entity results utilizing sponsored verbs and contexts for monetization.

FIG. 6 illustrates exemplary operations that may be performed by the circuitry of an ad server and/or a client-side application of a user in an exemplary system in order to generate entity and non-entity results utilizing sponsored verbs and contexts for monetization according to an additional embodiment. At block 602, a user enters a search query in a search field on a page view displayed on a client device, such as by the user interface of a web-browser or a native application running on the client device. The search query is communicated to a framework server over a network, such as network 120, by interface circuitry (such as the input/output interfaces 1440 in FIG. 14 or interface circuitry communicatively coupled to the network communications circuitry 1306 in FIG. 13). The search query may be received on the server side by the network communications circuitry 1306 and communicated to the framework circuitry, such as by one or more processing circuits or network interfaces 1430. At block 604, the search query may be processed by query processing circuitry associated with the one or more processing circuits in order to identify content items (e.g., such as persons, places, and things that may form object search results for entities search results) related to the search query. At block, 606 the system processor circuitry determines whether any entity content items are identified in the search query. At block 608, if an entity content item is identified, the system executes the search query for the entity on one or more entity search databases, which, in some embodiments, may include one or more of content database 114, module search framework database 116, or account database 104 described connection with FIG. 1. At block 610, entity circuitry communicatively coupled to the entity search databases return search results and information related to the entity content items. Optionally, the system may also execute the search query on non-entity search databases even when an entity is identified at block 606 in order to identify additional non-entity results.

Returning to block 606, if an entity content item is not identified in the search query, system circuitry, such as search suggestion circuitry or webpage search result circuitry, will execute the search query on non-entity search databases, which, in some embodiments, may include one or more of content database 114, module search framework database 116, or account database 104 described connection with FIG. 1. At block 614, search suggestion circuitry or webpage search result circuitry communicatively coupled to the non-entity search databases return search results and information related to the non-entity search result objects and search suggestions. In some embodiments, the non-entity search and entity-search databases may be the same database storing both entity and non-entity data, or each may consist of one or more distributed databases in operative communication over a network, such as the Internet.

At block 616, the system processor circuitry determines whether any intents are identified in or associated with the search query. Intent may be determined from the search query itself (e.g., by parsing the search query and identifying keywords), or may be determined by considering a number of additional factors, such as the prior page views leading up to the current page view (i.e., page views in the user's current session), similarity of the search to other searches and intents associated with the other searches, confidence levels that the parsed query identifies an intent is related to the query, tap through rates, bounce rates, and/or information extracted from user accounts or application provided by the search provider. At block 618, if an intent is not identified (or optionally if an intent is identified at block 618), the system may determine whether one or more contexts are associated with the search query. The system circuitry may determine contexts associated with all or some of the entity and non-entity search results, individually, in related groups, or as a whole. Relevant contexts may be determined using a number of circuit components, including, for example, analytics circuitry 306, targeting circuitry 308, and context circuitry 310 discussed in connection with FIG. 3, as well as based on data retrieved from or more device features, such as the accelerometer (e.g., that the device is moving), the gyroscope, the GPS (e.g., the city, state, zip, or other geographic location of the device), Bluetooth, WiFi (e.g., that WiFi is connected and available for more data intensive advertisements), and so forth.

At block 619, if no contexts are and no intents are identified, then the system may attempt to parse the query for keywords in order to target those keywords with sponsored verbs. At block 620, the system can generate a call-to-action button using the identified keywords, and in particular, those keywords determined to be most relevant to the user's search query. If a context was identified at block 618, the system proceeds to block 620 dynamically modifies (e.g., using display logic circuitry to generate modified display logic and graphical interface elements) the graphical search results based on the determined context. In some instances, the module circuitry of the system may dynamically edit content of the sub-GUI and modular search components, such as by adding local hours in for businesses (e.g., by the entity circuitry), generated maps (e.g., by the maps circuitry), or retrieve information related to products, such as availability and price. In other instances, the modular circuitry may alter the order of the sub-GUIs and modular search components to place those sub-GUIs that are determined to be most relevant to the contexts in an emphasized position. At block 620, these dynamic contexts, along with any intents identified at block 616, are processed by the analytics circuitry in order to identify all of the verbs associated with the contexts and intents, as well as the entity and non-entity search results themselves.

At block 624, the identified verbs are compared (e.g., by the analytics circuitry) to advertisement campaign data stored in the system databases (such as ad database 320 described in connection with FIG. 3) in order identify relevant advertisement campaigns. As described further in connection with FIG. 3, advertisers may specify many contexts and intents, as well as categories associated with their ad, such their advertisement campaign may be very targeted, or may specify very few contexts, intents, and/or categories, such that their campaign is very broad. For each identified verb, the system may retrieve the data for all campaigns that are both relevant to the entity and non-search entity search result, but that also match some portion of the identified contexts and intents. For example, if an intent is determined that the user is searching for movie tickets and a context is determined specifying a location and time, the system may retrieve advertisement campaigns relevant to movies and/or the particular movie searched, and may also retrieve advertisements that match the movie, location, time, or a combination thereof.

At block 625, if the advertiser has not identified any contexts or intents (e.g., if the advertisement was created before the advertiser started using the current system), then the system may proceed to block 626 and attempt to parse the advertisement data to identify contexts and intents that may be applicable to that particular campaign. In this way, campaigns that have not fully specified the given target contexts and intents may still make use of the novel features of the system. If the advertise has targeted contexts or intents, the system proceeds to block 628 and selects relevant advertisement campaigns matching the entity and non-entity search results, including those matching one or more of the contexts and intents. The system circuitry can select the most relevant advertisement campaign for each individual entity or non-entity search results (and/or an individual sub-GUI component that is associated with a particular intent or context) to be used for monetization. As discussed further in connection with FIG. 3, the system may utilize a number of factors, but may primarily consider bid value, historical targeting data for the particular verb (such as the click through rates for the different verb action), and the relevance of the responsive actions specified by the advertisers to the particular context identified for search result (e.g., bounce rate or percentage of visitors who are served the site in response to the action, but then leave without taking further action).

At block 630, the system circuitry dynamically generates a call-to-action button representing the selected advertisement and the corresponding sponsored verbs. The call-to-action button can be dynamically generated to reflect one or more aspects of the context or intent that was determined for the search query, as described in connection with FIG. 5. Each module or sub-GUI for the entity and non-entity search results can include a dynamically generated a call-to-action button representing a responsive verb, and may include multiple call-to-action buttons for multiple verbs in the same sub-GUI, such as shown in sponsored verb GUIs 810, 1110,1210 of FIGS. 8, 11, and 12, respectively. Additionally, each call-to-action button may be modified to consider the context (e.g., time, location, WiFi connectivity, GPS reading, accelerometer indication) or intent (e.g., to redeem a coupon, to rent a movie, to find a restaurant) to reflect those contexts and intents. Thus, the resulting call-to-action button for the sponsored verb incorporate dynamically generated data based on the identified contexts. This data may be retrieved from one or more third-party servers or databases that the system is able to access, such as through a public network or API.

At block 632, the system dynamically generates the modular content for entity and non-entity search results. At this stage, the system may also incorporate or embed the call-to-action buttons as clickable links, interactive GUI elements, or advertisements within one or more of the modular components for each entity and non-entity search result. The advertisement (which may be the call-to-action button itself in some embodiments) is then displayed as a portion of the entity or non-entity search result (e.g., as a portion of the root GUI or as a portion of one of the sub-GUIs). The advertisement may also be embedded alongside any of the entity and non-entity search results. At block 634, the graphical search results for the non-entity and entity search results incorporating the call-to-action buttons representative of sponsored verbs are returned to the user for display. For example, display logic circuitry may generate the necessary display logic and return the content from the framework server over the network to the user device where it is rendered on device display.

Figure 7:
FIG. 7 illustrates an exemplary display of a search result for an entity having call to action buttons generated utilizing sponsored verbs according to one embodiment.

FIG. 7 illustrates an exemplary simplified display of a graphical search result for an entity having call-to-action buttons generated utilizing sponsored verbs according to one embodiment. In this embodiment, entity card 700 is associated with a business entity called "Great Sushi Place." Although not depicted for simplicity sake, entity card 700 may be displayed on the display of a user device in response to user entity a search related to the business entity, such as any of the client devices 124-128 of FIG. 1, for example. Entity card 700 has an entity GUI 701 consisting of several modular components. Each of these modular components can be dynamically generated based on the search query, and may be modified or generated based on any identified intents or contexts. For example, depending on the search query and any context or intents associated with the search query, module circuitry may dynamically generates map content, social media content, related pictures or video content, summaries, excerpts from third-party websites, such as WIKIPEDIA®, and other relevant modular content to display as sub-GUIs. The order of the modules or sub-GUIs can be dynamically altered in response to the search query and taking into account any contexts or intents, and each module or sub-GUI may be emphasized, resized, or its content changed on an individual basis. As depicted in FIG. 7, the module circuitry and processing circuitry has processed the search query and dynamically generated at least five sub-GUIs 709, 710, 711, 712, and 714 in response to the query and as modular components for entity GUI 701, although more sub-GUIs may be generated and access by the user scrolling down on the display screen.

In this embodiment, the system circuitry may have also identified a context that the user submitted the search query on a Tuesday, and therefore, generated modular content relevant to that context. In particular, the system circuitry generated modular content as a sub-GUI 711 showing the hours of operation for the business entity on Tuesday. Additionally, a second context was identified consisting of the user's location, which may have been determined by WiFi triangulation, GPS, by parsing of the explicit query text, or other known geo-locating methods. In response to identifying the location context, the system dynamically generated information relating to the target entity's distance 704 from the user. Additional modular components were also generated in this example, including map content as subi-GUI 712 (which may have been generated the maps circuitry and operational content 714 for the business entity (which may have been generated by the summary circuitry and/or entity circuitry components).

Entity card 700 is also illustrated having a sponsored verb GUI 710 in the form of a tray of interactive interface elements, in this case buttons. As depictured in FIG. 7, not all of the interactive interface elements that may be generated for a particular modular component or sub-GUI may be sponsored verb contents. In some instances, default or general elements may be presented to the user and may be interleaved among sponsored content, including call-to-action buttons associated with sponsored verbs. In this case, call button 716 and more button 722 are not associated with sponsored or monetized content. In this embodiment, the sponsored content, on the other hand, is illustrated by icons 719 and 721 displayed as portion of navigate button 718 and reserve button 720. Navigate button 718 and reserve button 720 have been identified as related to the search query and related to the aforementioned identified intent and/or contexts. In this example, analytics circuitry may have identified that, given the location of the user and accelerometer or GPS data indicating that the user was moving, navigational directions may be relevant to the user's interest. In response, maps circuitry generated map content for sub-GUI 712 and the sponsored verb "navigate" was selected. After "navigate" was selected, an advertisement associated with navigation would have been selected from an advertiser that had previously utilized the sponsored verb marketplace to create an ad campaign, and an interactive element (or call-to-action) was dynamically generated for that verb and the selected advertiser. In this case, the advertiser information "NavigateNow" is displayed as a portion of the call-to-action button 718. Although not depicted, as mentioned, in some embodiments, instead of directly triggering information for the advertiser "NavigateNow," icon 719 associated with sponsored verb "navigate" may trigger a drop down menu or hierarchical interface overlay of multiple, related interactive icons that are associated with the verb "navigate." Each of these individual icons may be sponsored by individual advertisers and may be bid on or separately monetized using multiple auctions. Additionally, other related verbs to navigate, such as "ride" (public transport) or "call" (a taxi) may be determined to be relevant to the root verb "navigate" and may be included in the hierarchical menu or overlay.

Similarly, a second intent was identified for this result indicating that the user was interested in dining at the business entity and/or likely driving to the business entity to eat. In response, a second sponsored verb was identified for "reserve" as relevant to the user's interest in reserving a table at the business entity. A second advertisement campaign was matched to the second sponsored verb and a second graphical element generated and displayed as call-to-action button 720. Although not depicted, for each of call-to-action buttons 718 and 721, the advertisers, NavigateNow and BestFood, respectively would have specified a responsive action to take place upon a user clicking the call-to-action buttons 718,720, as described further in connection with FIG. 9.

Figure 8:
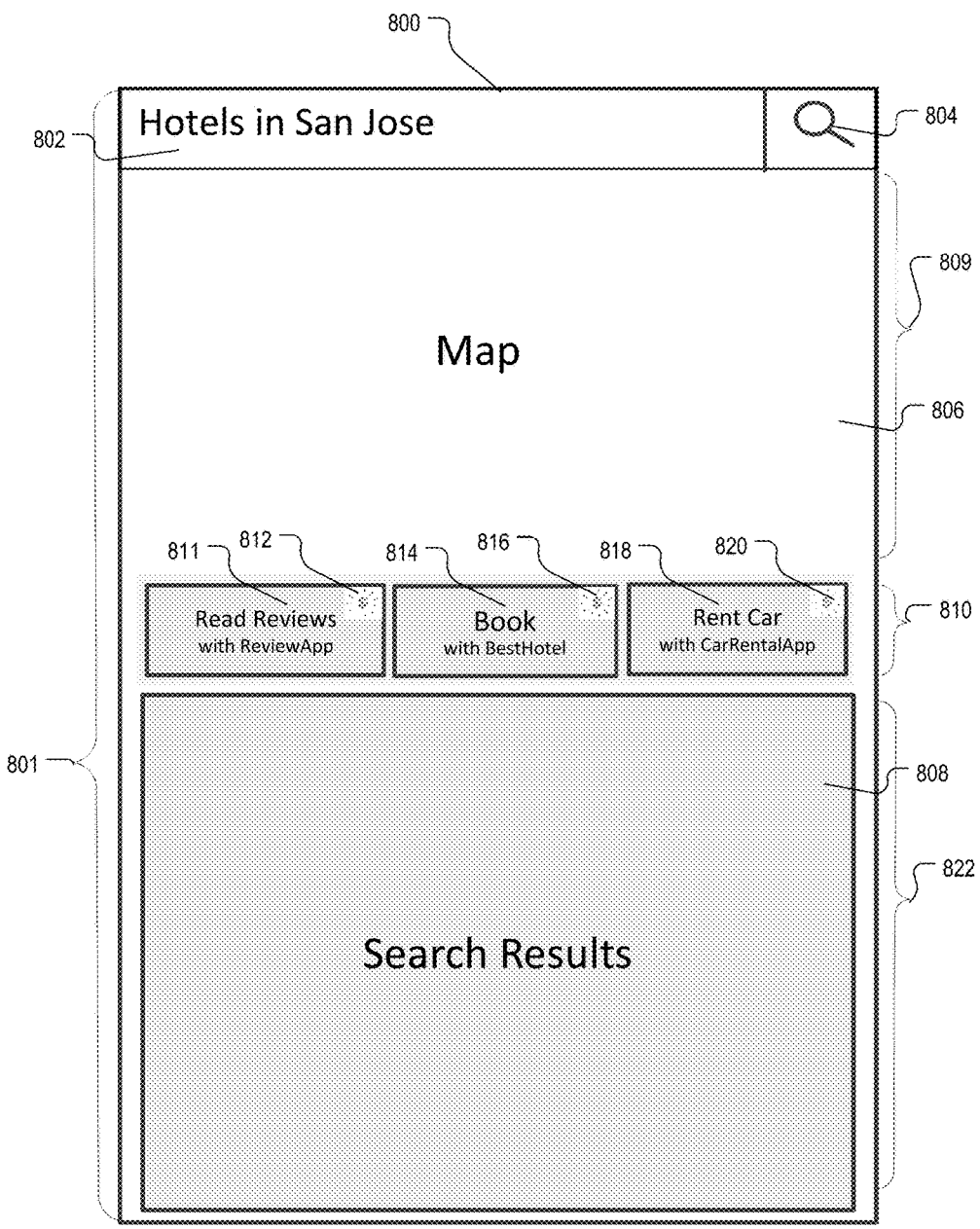
FIG. 8 illustrates an exemplary mobile search result for a non-entity displaying call-to-action buttons utilizing sponsored verbs according to one embodiment.

FIG. 8 illustrates an exemplary mobile search result for a non-entity displaying call-to-action buttons utilizing sponsored verbs according to one embodiment. In this embodiment, aspects and functionality of sponsored verbs and call-to-action buttons are depicted as being used with traditional search results page 800, such as those what may be displayed on a laptop, tablet, or mobile user device. Search results page 800 may be displayed in response to a user entering a query in search box 802, in this case "Hotels in San Jose," and clicking search button 804. In response to the user query, the system has parsed the explicit query to identify intents and contexts associated with the search query. In this simplified scenario, the determined intent may consist of the user's intention to book a hotel in San Jose, and a context may not have been identified. In this case, portions of the search results page 800 have been modified based on the determined intent, even though no context was determined. GUI 801 is shown as consisting of several sub-GUIs 809, 810, 822. In sub-GUI 809, a map 806 may be displayed depicting the location of hotels in San Jose, and in sub-GUI 822, search results consisting of entity and non-entity search results may be displayed in search results area 808.

In sub-GUI 810, call-to-action buttons 811, 814, 818, have been associated with sponsored verbs and generated to be displayed in response to the user query. Each call-to-action button is shown with an optional graphical sub-portion of the button 812, 816, 820 indicating that the button is a sponsored graphical element. In order to generate call-to-action buttons 811, 814, 818, the system circuitry (such as monetization circuitry 302 of FIG. 3 or verb monetization circuitry 1321 of FIG. 13) would have identified a set of verbs that are relevant to the search query and the user's identified intent to book a hotel in San Jose. For each of the available advertising opportunities, an individual auction may have taken place to select a winning sponsored verb related to the query that was bid on by an advertiser. In this case, the winning bids utilized the verbs "read," "book," and "rent," which would been determined to be relevant to the user query and the determined intent. As depicted in call-to-action buttons 811, 814, 818, the three winning bids were placed by the advertisers associated with the products "ReviewApp," "BestHotel," and "CarRentalApp," respectively. For each winning bid, a call-to-action button was created using the advertiser's information entered when creating the campaign, as well as the verb that was bid on. When creating the advertisement campaign, each of the advertisers would have specified a custom responsive action to take place upon a user clicking the call-to-action buttons 811, 814, 818, as described further in connection with FIG. 9.

FIG. 9 illustrates an exemplary interface for receiving advertiser bids and specifications for generating advertisements utilizing sponsored verb campaigns according to one embodiment. Display 900 consists of a simplified interface providing exemplary functionality for allowing an advertiser to access an electronic marketplace to create advertisement campaigns utilizing sponsored verbs. Although not depicted for simplicity sake, display 900 may be displayed on the display of an advertiser device in response to the advertiser accessing the marketplace provided by the framework server, such as the modular search framework server 116 of FIG. 1 or framework server 1300 of FIG. 13. The display logic for generating the interface elements described in connection with FIG. 8 may generated by display logic circuitry 1340 of FIG. 13, for example, which receives the information and content for the GUIs from the framework circuitry 1308.

In the example of FIG. 9, the advertiser "BestFood" has accessed the electronic marketplace to create an ad campaign and has entered its advertiser name in entry field 904. The advertiser may optionally choose to upload an advertiser logo utilizing upload element 906. In some embodiments, the advertiser logo may be incorporated as a background or portion of the call-to-action button created in response to a user query. The advertiser may also enter in textual information about the advertiser into entry box 916. In some embodiments, the textual information may be parsed to identify a number of product categories associated with the advertiser or may otherwise be algorithmically analyzed in order to improve targeting of sponsored verbs during auctions.

The electronic marketplace also allows advertisers to select sponsored verbs to bid on, to enter bid amounts, and to specify responsive actions to take place upon a user clicking on the call-to-action button that is generated using the ad campaign. Display 900 may include a number of interface elements allowing the advertisers to enter or select verbs to bid on, such as entry boxes 908, 910, and 912, which, in some embodiments, may be drop down menus, such as drop down menu 914. In other embodiments, the advertiser may enter the verbs as text or the system may recognize entered text as tags when a verb is entered. In this example, the advertiser has selected the verbs "reserve," "call," and "check-in" in entry boxes 908, 910, and 912, respectively. In action entry fields 916, 918, 920, the advertiser has entered an action to take place upon the user clicking on the call-to-action buttons that will be generated for each of the respective sponsored verbs. Exemplary responsive actions may include deep linking to an application installed on the user device, deep linking to a particular feature of that application, installing an application on the user device or linking to an application store where the application is available for download, redirecting to a particular website associated with the verb or action word, redirecting to a mobile browser, or utilizing one of the device features to execute a task (such as calling a number, sending a SMS message, pulling up navigation directions, etc.), although those of skill in the art will appreciate that numerous responsive actions may be specified by the advertiser without exceeding the scope of the present description In this case, the advertiser has specified a URL to open in response to the user clicking on any call-to-action button generated using the "reserve" sponsored verb, a telephone number to call in response to the user clicking on any call-to-action button generated using the "call" sponsored verb, and a deep link to a mobile application to open in response to the user clicking on any call-to-action button generated using the "check-in" sponsored verb. Although not displayed for simplicity sake, the electronic marketplace may also allow an advertiser to specify a number of contexts and intents that may be targeted by each the sponsored verbs. Alternatively, the system may determine which verbs are most relevant to an identified context or intent using analytics framework and historical targeting data for the particular verb (such as the click through rates for the different verb action), and the relevance of the responsive actions specified by the advertisers to the particular context identified for search result (e.g., bounce rate or percentage of visitors who are served the site in response to the action, but then leave without taking further action). In the latter case, the system may utilize analytics functionality, such as that provided by analytics server 118 of FIG. 1 or the analytics circuitry of FIG. 13, to improve targeting an identifying of the verbs that are most responsive to the user query and/or the targeted intent and context.

Figure 10:
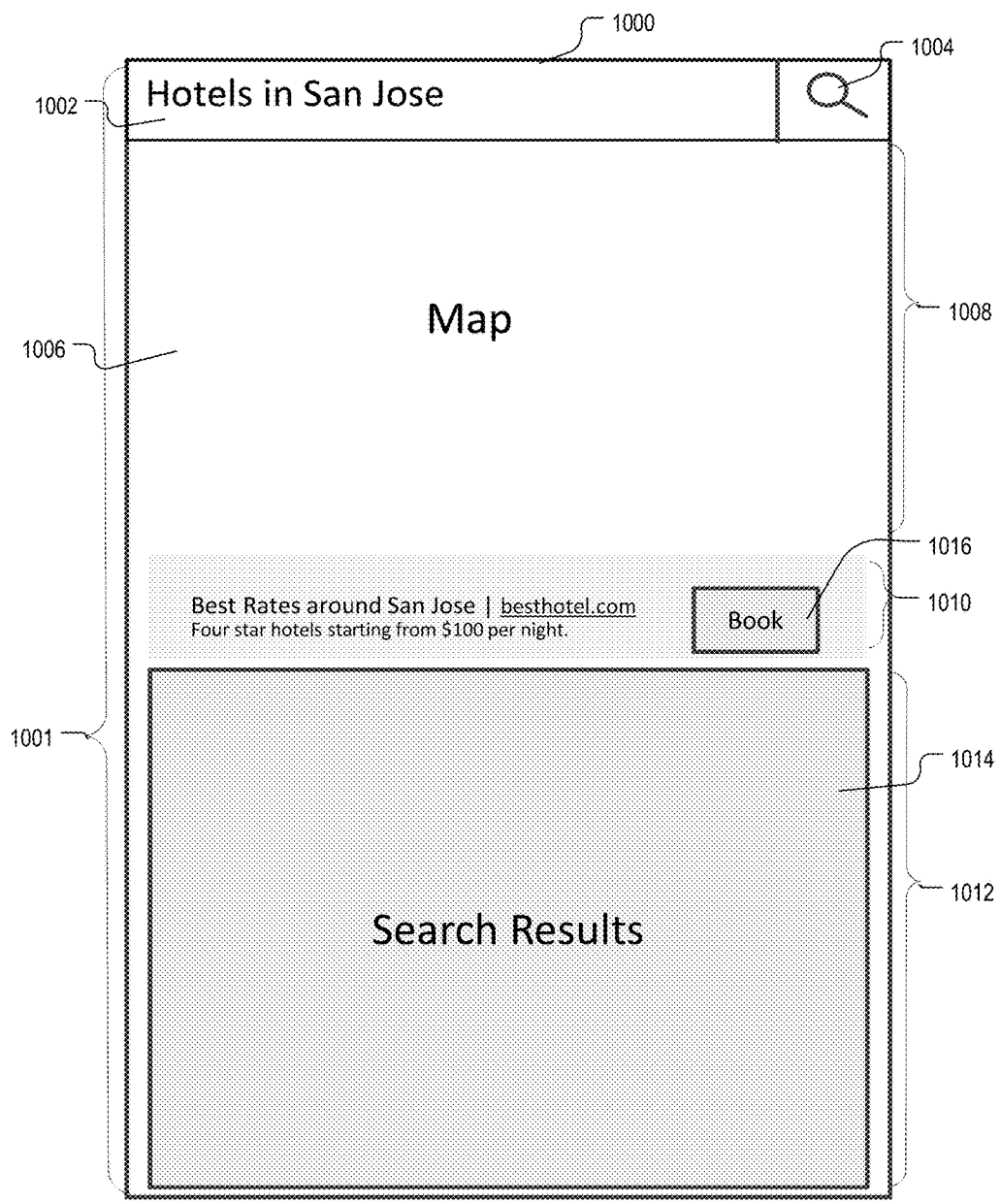
FIG. 10 illustrates an exemplary mobile search result for a non-entity displaying call-to-action buttons utilizing sponsored verbs according to one embodiment.

FIG. 10 illustrates an exemplary mobile search result for a non-entity displaying call-to-action buttons utilizing sponsored verbs according to one embodiment. In this embodiment, aspects and functionality of sponsored verbs and call-to-action buttons are depicted as being used with traditional search results page 1000, such as those what may be displayed on a laptop, tablet, or mobile user device. Search results page 1000 may be displayed in response to a user entering a query in search box 1002, in this case "Hotels in San Jose," and clicking search button 1004. In response to the user query, the system has parsed the explicit query to identify intents and contexts associated with the search query. In this simplified scenario, the determined intent may consist of the user's intention to book a hotel in San Jose, and a context may not have been identified. In this case, portions of the search results page 1000 have been modified based on the determined intent, even though no context was determined. GUI 1001 is shown as consisting of several sub-GUIs 1008, 1010, 1012. In sub-GUI 1008, a map 1006 may be displayed depicting the location of hotels in San Jose, and in sub-GUI 1012, search results consisting of entity and non-entity search results may be displayed in search results area 1014.

In sub-GUI 1010, a call-to-action button 1016 has been associated with sponsored verbs and generated to be displayed in response to the user query. In this embodiment, call-to-action button 1016 is displayed as sub-portion of a larger advertisement having advertiser information populated in the rest of the advertisement. In order to generate call-to-action button 1016, the system circuitry (such as monetization circuitry 302 of FIG. 3 or verb monetization circuitry 1321 of FIG. 13) would have identified a set of verbs that are relevant to the search query and the user's identified intent to book a hotel in San Jose. For each of the available advertising opportunities, an individual auction may have taken place to select a winning sponsored verb related to the query that was bid on by an advertiser. In this case, the system determined that the most relevant verb to the user's intent was "book," in order to book a hotel. Based on the high likelihood of relevance to the only identified user intent, the system may have determined that a larger advertisement was the most relevant advertisement to select. In this case, as depicted in call-to-action button 1016, the winning bid was placed by the advertisers associated with the besthotel.com and a call-to-action button was created using the advertiser's information entered when creating the campaign, as well as the verb "book" that was bid on. When creating the advertisement campaign, the advertiser would have specified a custom responsive action to take place upon a user clicking the call-to-action button 1016. The responsive action may be a deep link to an application on the user's phone, or a link to a URL where the hotel can be booked.

Figure 11:
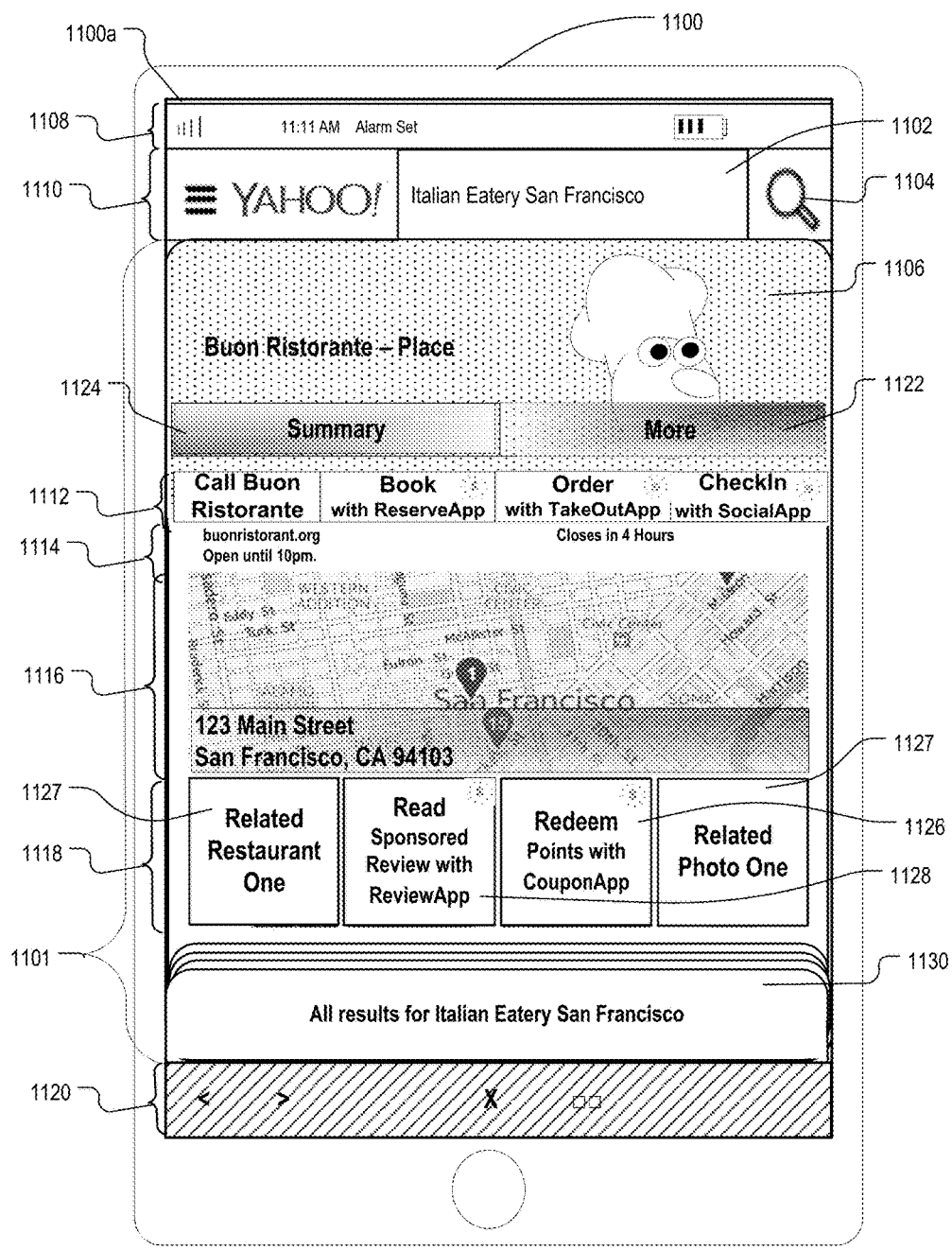
FIG. 11 illustrates an exemplary mobile search result for an entity generated by the modular search object framework and displaying call-to-action buttons utilizing sponsored verbs according to another embodiment.

FIG. 11 illustrates an exemplary mobile search result for an entity generated by the modular search object framework and displaying call-to-action buttons utilizing sponsored verbs according to another embodiment. In this embodiment, an exemplary client-side application is shown as running on a mobile client device 1100. The client-side application may be, for example, a mobile browser, web-based application, or native application running on a client device, such as a smart phone. The mobile client device 1100 may include display 1100*a* having graphical user interface (GUI) elements that a provided by the native operating system as part of the device experience, such as notification bar 1108 and an input keyboard (not displayed) that may be displayed or hidden depending on whether the user is interacting with a text field. Similarly, sections 1110 and 1120 are GUI elements provided by the client-side application executed on display 1100*a* of mobile client device 1100, such as a web browser or native application. Mobile client device 1100 also includes a touch screen portion 1101 that displays content in the remaining area of the device touch screen and allows a user to interact with the displayed content.

FIG. 11 shows search query text "Italian Eater San Francisco" entered in to a search query box 1102, such as via a native keyboard (not displayed). Alternatively, the text may be inputted through a voice command or other form of user input provided by the mobile application and/or native operating system. Upon entering of "Italian Eater San Francisco" into the search query box 1102 and clicking of search button 1104, search suggestions and/or search results may be automatically generated, such as by query processing circuitry on mobile client device 1100, and displayed on the display 1100*a* within section 1101. In this example, an entity search result for "Buon Ristorante" has been rendered by display logic circuitry on display 1100*a*. Alternatively, the entity search result for "Buon Ristorante" may be displayed directly in a response to a user search query for "Buon Ristorante" or may be displayed in response to a user selecting a contracted or condensed view of an entity search result object, such as graphical search results displayed as a stack of cards as described in connection with FIGS. 2*a* and 2*b* of commonly owned U.S. patent application Ser. No. 14/266,458, filed Apr. 30, 2014, entitled Modular Search Object Framework. In the latter case, user may return to the stack of cards or graphical search results by selecting button 1130 for all results related to "Italian Eatery San Franciso."

The fully expanded entity search result or card may provide information specific to the subject entity or other entities related to that entity that may be generated by one or more circuits as described in connection with FIG. 13. For example, section 1101 in FIG. 11 depicts a place entity card for the entity "Buon Ristorante" displaying information related to the entity. The information may be dynamically generated by one or more circuitry related to each of the modular components of the entity card. Each modular component has respective circuitry for executing various aspects of the module that may be dynamically generated and adapted to be responsive to the user query and any intents or contexts identified for the query. For example, in FIG. 11, the GUI is depicted as having summary content 1124 accessibly and which could be generated by an entity summary module and controlled by respective summary circuitry and or entity circuitry. This summary GUI includes summary information regarding the selected entity. Because the selected entity is a place or business, the summary module may generate summary information such as hours of operation, website address, time before the business closes, call or other contact buttons, and/or links to website menu. The information may be displayed in any of the sub-GUIs, such as in sub-GUI 1114 displaying hours of operation and dynamic information display how long until the restaurant closes.

Similarly, the GUI may contain other modules implemented by their respective circuitry such as a mapping module implemented by maps circuitry to generate and the display map section 116, a "more" module to generate and display a button 1122 allowing the user to search for additional information related to the entity, a photograph module to generate and display a related photograph section 1127, and so forth. In this example, sub-GUIs 1112, 1114, 1116, and 1118 have all been identified as relevant to the particular search query and were selected to be displayed in response to the query. The information that appears in each of the sub-GUI modules may be scraped information, information from a content database, information selected by a party that is responsible for editing the information, information selected by machine learning, or any combination thereof. Such information may include most sought out information for the selected entity. Most sought out information may be gathered from online search logs and other logs pertaining to web browsing.

Figure 13:
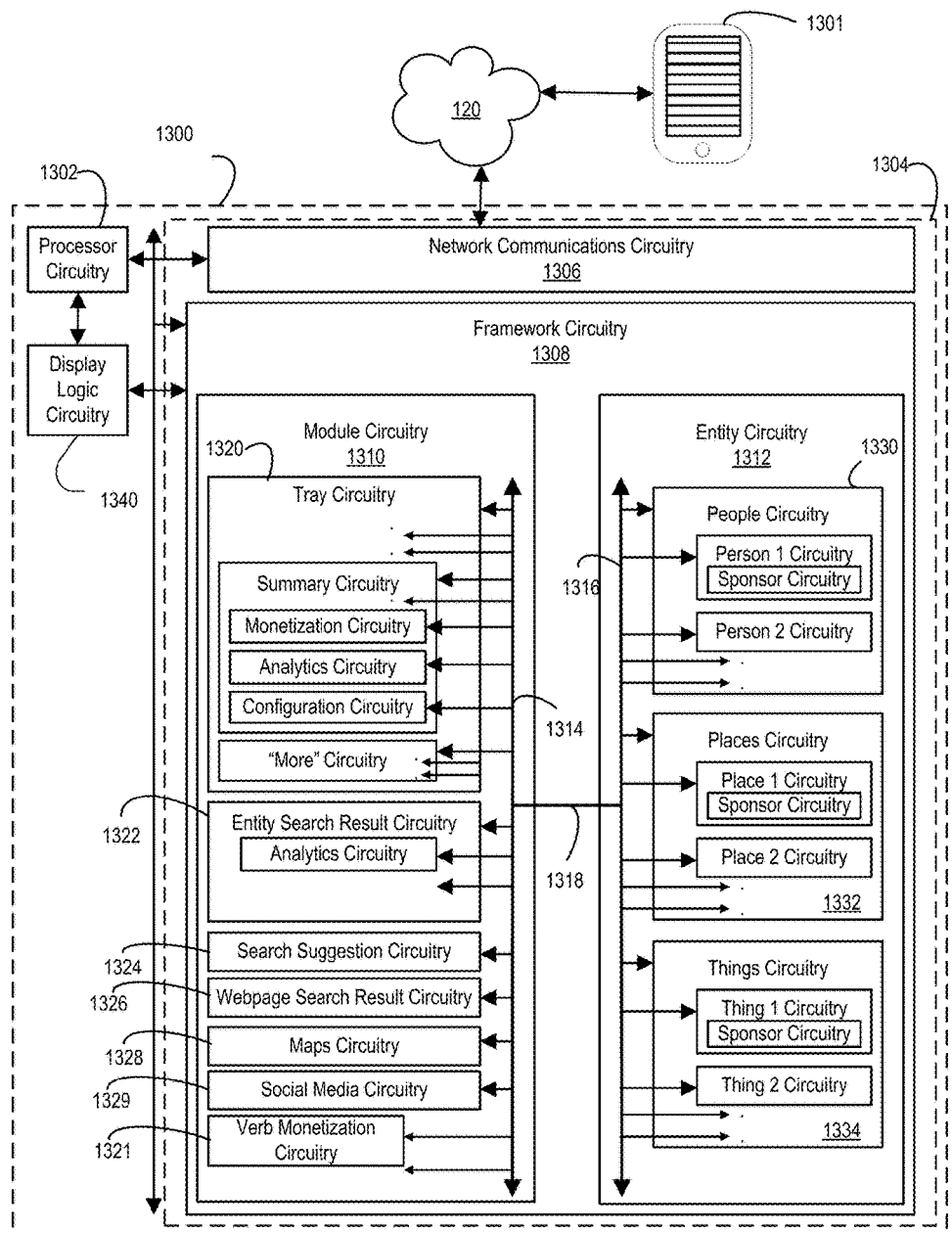
FIG. 13 illustrates a block diagram of exemplary circuitry of a server in an exemplary system according to one embodiment that can provide aspects of the module search object framework and generate call-to-action buttons for sponsored verbs.

For each of the sub-GUIs and modules displayed and rendered by the system circuitry, the system may utilize the verb monetization circuitry of FIG. 13 to identify advertising opportunities for the respective sub-GUI. In this example, two separate modules have identified advertising opportunities for generating call-to-action buttons using sponsored verbs. In particular, a tray of interactive buttons has been created as tray sub-GUI 1112. Tray sub-GUI 1112 contains interactive elements associated with both sponsored verbs (e.g., book, order and check-in) and default or general actions for the entity (e.g., call "Buon Ristorante"). These interactive elements are presented as part of the same tray GUI and are interleaved among each other. Similarly, advertising opportunities have also been identified for related content tray GUI 1116. For related content tray GUI 1116, some default content has been identified as a related photo 1127 and related restaurant 1129, and this content has been interleaved among sponsored content utilizing sponsored verbs 1126, 1128.

For each of the available advertising opportunities, an individual auction may have taken place to select a winning sponsored verb related to the query that was bid on by an advertiser. As discussed further in connection with FIG. 3, the system may utilize a number of factors, but may primarily consider bid value, historical targeting data for the particular verb (such as the click through rates for the different verb action), and the relevance of the responsive actions specified by the advertisers to the particular context identified for search result (e.g., bounce rate or percentage of visitors who are served the site in response to the action, but then leave without taking further action). In this case, the winning bids for tray sub-GUI 1112 utilized the verbs "book," "order," and "checkin," which would been determined to be relevant to the user query and the determined intent of finding a restaurant to eat in San Francisco. As depicted in the three call-to-action buttons depicted in tray sub-GUI 1112, the three winning bids were placed by the advertisers associated with the products "ReserveApp," "TakeOutApp," and "SocialApp," respectively. For each winning bid, a call-to-action button was created using the advertiser's information entered when creating the campaign, as well as the verb that was bid on. When creating the advertisement campaign, each of the advertisers would have specified a custom responsive action to take place upon a user clicking the call-to-action buttons, as described further in connection with FIG. 9.

In this case, the ReserveApp advertiser may have identified an application for reserving open tables at restaurants to deep link to on the user's device. The deep link may access the application on the device, retrieve the restaurant information for "Buon Ristorante," and access reservation details for a time determined from a context associated with the search query. If no time context was determined from the explicit user query, then the default system may determine a default to populate the restaurant reservation application with. In some embodiments, the system circuitry may communicate to make a determination of when the time that the user is most likely to be interested in and to use this time as an identified context for the query. For example, the system may communicate with the maps circuitry and navigation circuitry to identify that the user is two hours away from the Buon Ristorante location in San Francisco. Therefore, the system may determine that the time most likely to be of interest to the user is at least two hours in the future. This context may be dynamically populated into the deep link action for ReserveApp. As another example, if no time context was determined from the explicit search query again, the system may communicate with the maps circuitry to identify that the user is at the same geographic location as the Buon Ristorante location in San Francisco. In this case, the system will determine that the user is most likely already at the restaurant and therefore, that a possible user intent may be to check-in using a social application. The system may then use this intent to determine that the one of the most relevant verb for the user intent is "check-in" and has therefore selected "SocialApp" as the winning advertiser for one of the call-to-action buttons in tray sub-GUI 1112. Similarly, other relevant intents would have been identified and auctions conducted for the intents to read a review of the restaurant (resulting in call-to-action button 1128) and to receive a discount coupon for the restaurant (resulting in call-to-action button 1126). Each of these call-to-action buttons can be the result of an independent auction and may be selected based on a determination that the they are most relevant to one or more possible determined intents for the search query or the user action of viewing the entity card for "Buon Ristorante."

FIG. 12 illustrates an exemplary mobile search result for a second entity generated by the modular search object framework and utilizing sponsored verbs according to one embodiment. Similar to FIG. 11, in this embodiment, an exemplary client-side application is shown as running on a mobile client device 1200. The client-side application may be, for example, a mobile browser, web-based application, or native application running on a client device, such as a smart phone. The mobile client device 1200 may include display 1200a having graphical user interface (GUI) elements that a provided by the native operating system as part of the device experience, such as notification bar 1202 and an input keyboard (not displayed) that may be displayed or hidden depending on whether the user is interacting with a text field. Similarly, sections 1204 and 1214 are GUI elements provided by the client-side application executed on display 1200a of mobile client device 1200. Mobile client device 1100 also includes a touch screen portion 1201 that displays content in the remaining area of the device touch screen and allows a user to interact with the displayed content.

FIG. 12 shows search query text "Gravitational Force Showtimes" entered in to a search query box 1216, such as via a native keyboard (not displayed). Upon entering of "Gravitational Force Showtimes" into the search query box 1216 and clicking search button 1218, an entity search result for the "Gravitational Force" movie has been rendered by display logic circuitry on display 1200a. The system has processed the user query and any stored historical or account content associated with the user or the user device, in order to determine any intents and contexts associated with the search query. In this instance, the system has determined that the user's intent is to search for showtimes for the "Gravitational Force" movie. The system has also extrapolated this intent to additional related intents associated with reading reviews, buying tickets, renting movies, and receiving coupons related to "Gravitational Force" movie or other similar movies. Based on these identified intents, the system has dynamically assembled sub-GUI portions 1206, 1208, 1210, and 1212 to be displayed as portions of the touch GUI 1201, alongside native GUI portions 1202, 1204 and 1214.

Because the primary intent identified for the user query was to search for showtimes for the "Gravitational Force" movie, the system has displayed the fully expanded search result or card with the "more" tab selected in sub-GUI portion 1206. The system has also identified a context as the time of day that the search query was submitted and a second context as the location of the user. The system has communicated with a number of entity circuits to dynamically populate this portion of the GUI with upcoming showtimes based on the time context and the location context. Similarly, sub-GUI portion 1210, generated by the maps circuitry, has been dynamically generated include a map 1234 identifying nearby locations 1236, 1238 and text 1240 communicating nearby locations where the movie can be viewed to the user. Each of the nearby locations 1236, 1238 may be sponsored or promoted by advertisers.

For each of the sub-GUIs and modules displayed and rendered by the system circuitry, the system may utilize the verb monetization circuitry of FIG. 13 to identify advertising opportunities for the respective sub-GUI, similar to as discussed in connection with FIG. 12. In the example of FIG. 13, two separate modules have identified advertising opportunities for generating call-to-action buttons using sponsored verbs. In particular, interactive buttons have been created as a portion of the more module 1206. More module 1206 contains interactive elements associated with several sponsored verbs, including book, redeem, read, and rent. These interactive elements are presented as part of the more module 1206 and may interleaved among or presented alongside additional content dynamically generated by the "more" circuitry and displayed in more module 1206. Similarly, advertising opportunities have also been identified for related content tray GUI 1208. For related content tray GUI 1208, some default content has been identified as a related content 1230, and this content has been interleaved among sponsored content utilizing sponsored verbs 1242, 1244, and 1232.

For each of the available advertising opportunities, an individual auction may have taken place to select a winning sponsored verb related to the query that was bid on by an advertiser. In this case, the winning bids for more module 1206 utilized the verbs "book," "read," "redeem," and "rent," which would been determined to be relevant to the user query and the determined intent of finding showtimes and information related to the "Gravitational Force" movie. As depicted in the four call-to-action buttons depicted in more module 1206, the four winning bids were placed by the advertisers associated with the products "MovieApp," "ReviewApp," "DiscountApp," and "RentApp," respectively. For each winning bid, a call-to-action button was created using the advertiser's information entered when creating the campaign, as well as the verb that was bid on. When creating the advertisement campaign, each of the advertisers would have specified a custom responsive action to take place upon a user clicking the call-to-action buttons, as described further in connection with FIG. 9. Similarly, other relevant intents would have been identified and auctions conducted for related intents, such as to view a trailer of the movie, which resulted in call-to-action button 1242 being generated for advertiser MovieApp. Additionally, the call-to-action buttons may be displayed alongside related sponsored content, such as related ads 1232 and 1244.

FIG. 13 illustrates a block diagram of example circuitry of a server of a system that can provide aspects of the module search object framework according to one embodiment, such as the modular search framework server 116 illustrated in FIG. 1. FIG. 13 also shows a client device 1301 (which, in some embodiments, may be any of the client devices 124-128 described in connection with FIG. 1, device 1100 of FIG. 11, and/or device 1200 of FIG. 12) communicatively coupled to a framework server 1300, over the network 120. Although depicted as a single server and component circuitry, in some embodiments, the server 900 may include one or more distributed servers and components communicatively coupled over a network, such as the modular search framework server 116, the search engine server 106, the ad server 108, the sponsored search server 117, the analytics server 118, or any combination thereof. The server 1300 includes processor circuitry 1302 and a system stored in a non-transitory medium 1304 (such as a memory 1410) executable by the processor circuitry 1302. The system components are configured to provide several aspects of the framework described in the present description.

The system includes network communications circuitry 1306 (such as circuitry included in the network interfaces 1430) and framework circuitry 1308 (such as circuitry included in the modular search object framework 1426). The network communications circuitry 1306 and the framework circuitry are communicatively coupled by circuitry. In the present disclosure, circuitry may include circuits connected wirelessly as well as circuits connected by hardware, such as conductive wires or traces through which electric current can flow. The network communications circuitry 1306 may be configured to communicatively couple the system to the client device 1301 over the network 120, which, in some embodiments, can be the Internet. This, for example, allows a modular section or sub-GUI of an entity to be provided by the server 1300 and displayed by a client-side application installed on the client device 1301.

The framework circuitry 1308 includes module circuitry 1310 (such as module circuitry 1427a), entity circuitry 1312 (such as entity circuitry 1427b), inter-module interface circuitry 1314, inter-entity interface circuitry 1316, and inter-framework interface circuitry 1318. The inter-module interface circuitry 1314 may be configured to communicatively couple any module circuitry of the module circuitry 1310. For example, this circuitry 1314 may at least communicatively couple entity GUI module circuitry, such as tray module circuitry 1320, to one or more other circuitry of the module circuitry 1310.

The inter-framework interface circuitry 1318 may be configured to communicatively couple at least one entity circuitry of the entity circuitry 1312 to any one of the plurality of module circuitry in the module circuitry 310, such as coupling any one of the entity circuitry to the tray module circuitry 1320. For example, for the sub-GUI and modular entity sections illustrated in FIGS. 7, 8, 10, 11, and 12, the tray module circuitry may be configured to interact with the at least one entity circuitry to output an interactive entity section to a page view for a corresponding entity. Also, in such an example, the interactive section may include a plurality of moveable visual objects or interface elements with information relevant to the corresponding entity. This information can be dynamically generated by one or more circuit components of module circuitry 1310, such as maps circuitry 1328, social media circuitry 1329, or verb monetization circuitry 1321. Additionally, the plurality of moveable visual objects may be moveable within any of the interactive entity sections. These functions can be implemented via the interoperating of the sub-circuitry of the module circuitry 1310 and the entity circuitry 1312.

Further, these moveable objects and associated functionality can be provided by any type of module circuitry and entity circuitry interoperating by the coupling provided by the inter-framework interface circuitry 1318. In an example embodiment, the moveable visual objects may be displayed as cards related to entity and non-entity search results. Also, the cards may have rounded corners as depicted in FIGS. 11 and 12. In each of the cards (sometimes referred to herein as root GUIs of graphical search results), the card may include a multitude of modular sub-components or sub-GUIs, such as a miniature tray of miniature cards displayed within the sub-GUI of the root card, and the miniature cards may include information relevant to the entity, as depicted in sub-GUI 1118 of FIG. 11. The moveable object may further include links for navigation between entities, and such objects may be overlapping, such as where a first overlapping object is moveable to view at least part of a second object beneath the first object. The moveable visual objects may be adjacent to or abutting one other object of the moveable objects. These functions can be implemented via the interoperating of the sub-circuitry of the module circuitry 1310 and the entity circuitry 1312.

Additional beneficial functionality, such as movement by an object of the plurality of moveable objects being seamless without unintentional visual artifacts, can be due to close coupling of the circuitry of the framework circuitry 1308. Close coupling between client-side circuitry of the framework circuitry installed on the client device 1301 and native operating system circuitry of the client device, circuitry of a client-side application installed on the client device, or both, can improve such beneficial functionality as well. In some embodiments, code can be communicated from the server 1300 to the client device 1301, which provides additional functionality to and configuration of the client-side circuitry of the framework circuitry for the client device. For example, circuitry and functionality within client device 1301 may be added to or altered according to such code communicated from the server 1300. The code may include objects representative of part of the framework circuitry 1308.

The inter-entity interface circuitry 1316 may be configured to communicatively couple at least one of the plurality of entity circuitry to one or more other of the plurality of entity circuitry, of the entity circuitry 1312. The inter-entity interface circuitry 1316 is communicatively coupled to the inter-module interface circuitry 1314 by the inter-framework interface circuitry 1318. These interconnections can provide a basis for the linking between entities as illustrated in FIGS. 11 and 12 corresponding text, as well as for associating certain module GUIs and sub-GUIs with each of the entities.

The module circuitry 1310 also includes at least one component circuitry for implementing the functionality described in connection with FIGS. 2-12, such as the tray module circuitry 1320 and verb monetization circuitry 1321. Other examples of module circuitry within the module circuitry 1310 can include entity search result circuitry, search suggestion circuitry, non-entity search result circuitry (such as webpage search result circuitry), maps circuitry, and many more circuit components that may not depicted in FIG. 13 for sake of simplicity. Such circuitry can provide the various structures and operations illustrated and described in connection with FIGS. 2-12. As illustrated by FIG. 13, a hierarchy of module circuitry within the module circuitry 1310 can be extensive. For example, module circuitry, such as the tray module circuitry 1320, can include sub-module circuitry, and that sub-module circuitry can each have sub-module circuitry of its own. For example, a majority of the module circuitry of the circuitry 910 (whether or not a sub-module circuitry) can each at least include sub-module circuitry configuring that circuitry and configuring one or more GUIs or sub-GUIs provided by that circuitry. The example organization of the circuitry of the module circuitry 1310 coincides with the arrangement of GUIs and sub-GUIs illustrated in FIGS. 7-12. However, other arrangements could coincide with the depicted GUIs as well.

The tray circuitry 1320 may include the summary circuitry, the tray configuration circuitry that may include the tray GUI configuration circuitry, and the "more" circuitry associated with the "more" GUI depicted in FIGS. 11 and 12, for example. The tray circuitry 1320 includes other sub-circuitry for other functions that may be implemented by the modular framework related to a tray object that is displayed as a portion of a graphical search result for an entity or non-entity result. The summary circuitry includes configuration circuitry such as circuitry for the configuration of the summary GUI portion of a root GUI or entity card, analytics circuitry, and monetization circuitry. The analytics circuitry may provide for at least part of the information that is determined to be intended to be viewed by a user (which may be dynamically modified by the determined intents and contexts associated with the user query) and may interact with aspects of an analytics server, such as analytics server 118 to improve feedback and the resulting content at least partially based on the feedback. Several GUIs of the framework may be associated with the analytics circuitry of the summary circuitry or other analytics circuitry of module circuitry 1310. Such GUIs are likely to incorporate predictively desired information to audience members of the framework, which can be predicted in part by analytics. The monetization circuitry may be configured to record and communicate any user interactions with an interactive section (such as the entity tray) to the sponsor circuitry corresponding to the interactive entity section. The sponsor circuitry depicted in people circuitry 1330, places circuitry 1332, and things circuitry may be configured to determine and record a fee for the interaction with the interactive entity section.

As illustrated in FIG. 13, each sub-circuitry of the module circuitry 1310 may include monetization circuitry for monetization of corresponding framework aspects and features implemented by the respective circuitry components, and may work in conjunction with verb monetization circuitry 1321 to provide aspects of monetization for sponsored verbs and contexts, as described further in connection with FIG. 3. Also as illustrated in FIG. 13, each individual entity circuitry of the entity circuitry 1312 may include its own sponsor circuitry. In an example, the monetization circuitry of the various circuitry of the module circuitry 1310 and the sponsor circuitry of individual entity circuitry of the entity circuitry 1312 can be tightly coupled to enhance entity sponsorship and monetization processing for aspects and features of the framework selected for sponsorship and monetization.

The entity search result circuitry 1322 may provide various functionalities and structures associated with retrieving and displaying sponsored and non-sponsored entity search results, such as the sponsored and non-sponsored entity search results depicted in FIGS. 7, 8, and 10-12. The search suggestion circuitry 1324 may provide various functionalities and structures associated with retrieving and displaying sponsored and non-sponsored search suggestions. The webpage search result circuitry 1326 may provide various functionalities and structures associated with retrieving and displaying webpage search results, such as sponsored and non-sponsored webpage search results. For the purposes of the present description, webpage search results are an example of non-entity search results. Other example, non-entity search results are image search results associating images with a search query. Entity search results, on the other hand, are results that include informational objects for a specific entity, such as a particular person, place, or thing. With each of the places and things, there are often associated sub-entities an each sub-entity can be displayed as a sub-GUI when the root entity GUI is displayed.

The maps circuitry 1328 may provide various functionalities and structures associated with retrieving and displaying maps based search results, such as the map search results depicted in FIGS. 11 and 12. The maps circuitry 1328 may include or be associated with navigation circuitry of the module circuitry 1310 (such as circuitry for discovering routes and device geographic positioning and for providing navigational directions). The social media circuitry 1329 may provide various functionalities and structures, such as GUI elements, associated with presenting social media information and providing social media applications, such as social media widgets. The social media circuitry 1329 may be communicatively coupled over a network with servers of social media provides, such as TUMBLR®, LINKEDIN®, GOOGLE PLUS®, FACEBOOK®, TWITTER, and the like. Information feeds and applications provided by the social media servers can be administrated by the social media circuitry for execution on sponsored and non-sponsored entity trays and GUIs. The social media features as well as any other features described herein may be monetized, and the social media circuitry 1329 may include its own circuitry dedicated to monetization.

Additionally, verb monetization circuitry 1321 may be communicatively coupled to any of the aforementioned circuitry via inter-module interface circuitry 1314. Verb monetization circuitry 1321 can process requests for sponsored verbs or contexts associated with the sub-GUIs generated by any of the aforementioned circuitry in order to generate call-to-actions as described in connection with FIGS. 2-12. For example Verb monetization circuitry 1321 may receive a request to identify sponsored verb opportunities in connection with an entity search result being displayed by entity search result circuitry 1322 or from any of the individual circuitry of entity circuitry 1312. Verb monetization circuitry 1321 may conduct several auctions to identify advertisement opportunities associated with the sponsored verb and any intents or contexts determined to be relevant to the display of the entity GUI. Display logic circuitry 1340 is also communicatively coupled to the interface circuitry and dynamically generates, in response to the search query, the call-to-action buttons to be displayed as a sub-portion of the root GUI associated with the entity.

As mentioned, each of the module circuitry may include sub-module circuitry, such as corresponding user interface circuitry, configuration circuitry, analytic circuitry, data processing circuitry, query processing circuitry, data storage circuitry, data retrieval circuitry, navigation circuitry, or any combination thereof. A complete listing of the various types of module circuitry and sub-module circuitry are numerous and beyond the scope of this application. The examples of module circuitry described herein and shown in FIG. 13 are merely illustrative of the expansiveness of the framework.

The entity circuitry 1312 include various types of entity circuitry, including people circuitry 1330, place circuitry 1332, and thing circuitry 1334. Individual entity circuitry associated with the people circuitry 1330, place circuitry 1332, and thing circuitry 1334 can include respective sponsor circuitry, such as depicted in FIG. 13. In one example, control of an online entity module through one of the people circuitry 1330, place circuitry 1332, and thing circuitry 1334, such as a module for national business entity or a module for a specific location of that business, can be purchased through sponsorship. In an example, sponsorship can go to the highest bidder. In another example, sponsorship can go to the highest bidder who also has a legitimate claim to that entity module. In yet another example, sponsorship can only be obtained and/or purchased by the actual entity or at least a legal representative of that entity.

As it can be imagined, an entity entitled to claim a given online entity module can become complex, so some example implementations can utilize any combination of the aforementioned rules for claiming an entity. For example, in one scenario, only the legal entity Great Sushi Place, described in connection with FIG. 7, can purchase sponsorship of the Great Sushi Place business entity, but where Great Sushi Place is a franchise, each location of Great Sushi Place may be purchased by its respective franchisee and/or the franchisor Great Sushi Place. The franchisee and franchisor could compete in a bidding process or reach an agreement for payment of the sponsorship themselves. Further complications in claiming an entity may arise, including entities that are not owned. For example, a historical entity, such as the Holy Roman Empire, does not have an owner, so in some scenarios sponsorship associated with such an entity may go to the highest bidder or the ad campaign that is determined to be most similar to any intents or contexts associate with the user search query. The sponsorship could also be shared with another entity, so that more than one entity can utilized ad time on the Holy Roman Empire module.

Similar monetization schemes can be used for each of the sub-GUI components displayed in connection with the root GUI for the entity. The system may make use of the electronic marketplace provided to advertisers described in connection with FIG. 9 to provide individual auctions for each of the sub-GUI components associated with an entity. The electronic marketplaces allows advertiser to bid on sponsored verbs that can be displayed as call-to-action buttons when the system determines that they relevant to the entity GUI, or to one of the displayed sub-GUIs (which may be dynamically modified in response to any determined intents or contexts leading up to the display of the root GUI). The auctions may allow advertisers to bid on a number of display parameters, such as size and the portion of the sub-GUI that the sponsored verb occupies, as well as various methods for emphasizing a sponsored GUI element. This allows dynamic customization of the interface elements during creation in a way that is responsive to a number of features which may be auctioned to the advertiser.

In one scenario, the framework service provider of the entity modules may maintain a degree of control over the content and customization that may be presented by the system in connection with a specific entity module. For example, the provider may pay a fee to regulate the amount of irrelevant content added to a GUI of an entity module. Also, the look and feel of module to some degree may be maintained by the provider to maintain consistency of the look and feel of the environment hosting the entity modules. Also, the provider control can allow for the provider to prevent content from becoming stale. For example, if can entity does not maintain its content regularly, a provider can predict content a user and/or a sponsor wants to be presented by a GUI of an entity module and provide such predicted content instead of the stale content.

Referring back to FIG. 13, the people circuitry 1330 includes circuitry for each particular person that can be identified as an entity by the framework. A particular person can be an actual living person or a person who has passed away. Well-known people, who are often searched online, such as celebrities, may be automatically inputted into the framework and hence circuits are generated for those people automatically. Less known people, such as an ordinary Joe starting a small business, may submit an application for circuitry to be generated for themselves or a business and/or product they wish to market through the framework. A particular person can also be a character in a fictional work. For fictional characters, there may be a plurality of entities for a known character. The front end for the modular search framework server 116 and/or the account server 102 can facilitate entry of entities, such as people entities.

The place circuitry 1332 includes circuitry for each particular location that can be identified as an entity by the framework. A particular location can be an address, a global positioning point, an actual location not having an address, or combination thereof. Actual locations not having an address can be submitted through an application process, such as an obscure park. Locations that are commonly searched without an address can be automatically inputted into the system as circuits, such as a national park. In other words, well-known places, which are often searched online, such as landmarks, government administrated parks, cities, countries, and even well-known bodies of water, may be automatically inputted into the framework and hence circuits are generated for those places automatically. Less known places, such as an ordinary parking lot without an address, may be submitted via an application for circuitry to be generated for that place. Businesses and products may be marketed through a place entity, for example. Places can be any geographic entity, whether that entity is fictional, non-fictional, still in existence, historical, or some combination thereof. For fictional places, there may be a plurality of entities for a known fictional place. For example, each iteration of Atlantis used in fictional works may have its own entity circuit. A place entity becomes identifiable when a corresponding entity has been submitted and accepted by the framework. At that point, circuitry can be generated for that place entity. A front end for the modular search framework server 116 and/or the account server 102 can facilitate entry of entities, such as place entities.

The thing circuitry 1334 includes circuitry for each particular thing that can be identified as an entity by the framework. A particular organization, product, service, named organism (such as a pet or famous circus animal), can be a thing entity. Thing entities can overlap with places entities and fictional character entities; for example, a geographic location such the dark side of the moon may be a thing as well. Well-known things, which are often searched online, such as movies, mass manufactured products, and large companies, may be automatically inputted into the framework and hence circuits are generated for those things automatically. Less known things, such as a new product developed by an ordinary Joe, may be submitted via an application for circuitry to be generated for that thing. Services and products may be marketed through a thing entity, for example. Things can be almost any unambiguous thing that can be claimed. Things can be fictional, non-fictional, still in existence, historical, or some combination thereof. A thing entity becomes identifiable when a corresponding entity has been submitted and accepted by the framework. At that point, circuitry can be generated for that thing entity. A front end for the modular search framework server 116 and/or the account server 102 can facilitate entry of entities, such as thing entities.

Each particular person, place, or thing circuitry of the entity circuitry 1312 can include and provide respective data models for gathering, maintaining, and entering information on that corresponding entity. The data models can include sponsorship and monetization models as well. These data models can also act as an interface for data requested by various operations provided by the module circuitry 1310. Each particular entity circuitry may also include logic for facilitating operations between module circuitry of the circuitry 1310 and databases storing information on entities. In other words, such entity circuitry may act a middleware between functions and data of the framework. Given this middleware functionality, module circuitry, such as the summary module circuitry, does not need to include sub-circuitry for every entity in the system. When module circuitry is called for an entity, that module circuitry can combine with the entity circuitry via communications instead of actual circuitry per entity hardwired into each module.

Regarding the example entity screen in FIG. 11, various functions are being called which are provided by the module circuitry 1310, such as functions of the summary module circuitry. For a function of the summary module circuitry to retrieve information on Buon Ristorante the thing, the function communicates with the particular entity circuitry for Buon Ristorante the thing. This particular entity circuitry may have the information on Buon Ristorante cached or permanently stored within its circuitry or may request the information from a database, such as a database specifically for the modular search framework server 116 (not depicted in FIG. 1) and/or the content database 114 or ad database 110.

Figure 14:
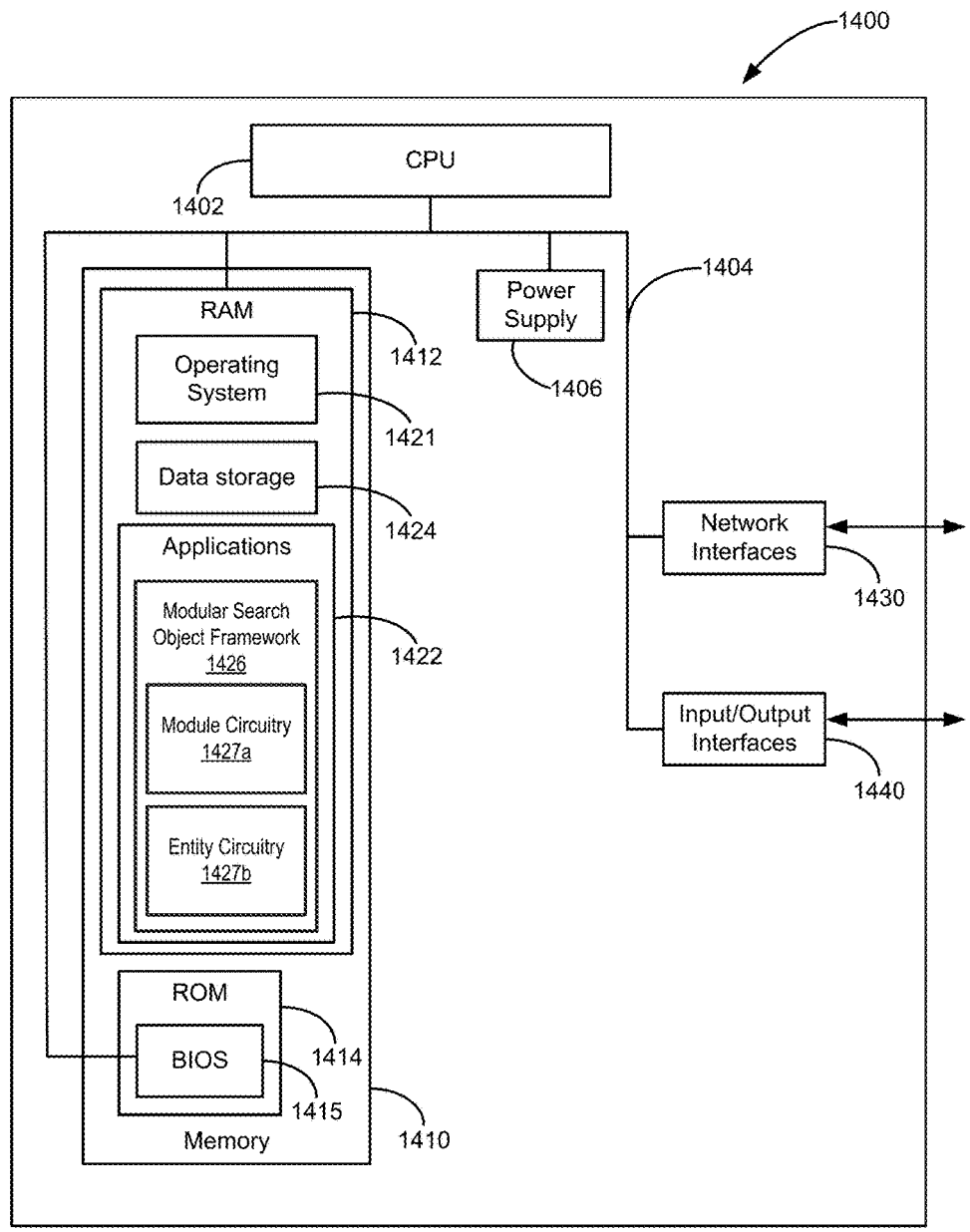
FIG. 14 illustrates a block diagram of an exemplary electronic device for implementing various server-side aspects of the framework for utilizing sponsored verbs and contexts.

FIG. 14 is a block diagram of an example electronic device 1400 that can implement server-side aspects of and related to example aspects of the framework. For example, the electronic device 1300 can be a device that can implement the modular search framework server 116 of FIG. 1 or the server 1300 of FIG. 13. The electronic device 1400 can include a CPU 1402, memory 1410, a power supply 1406, and input/output components, such as network interfaces 1430 and input/output interfaces 1440, and a communication bus 1404 that connects the aforementioned elements of the electronic device. The network interfaces 1430 can include a receiver and a transmitter (or a transceiver), and an antenna for wireless communications. The CPU 1402 can be any type of data processing device, such as a central processing unit (CPU). Also, for example, the CPU 1402 can be central processing logic.

The memory 1410, which can include random access memory (RAM) 1412 or read-only memory (ROM) 1414, can be enabled by memory devices. The RAM 1412 can store data and instructions defining an operating system 1421, data storage 1424, and applications 1422. The applications 1422 can include a modular search object framework 1426 (such as framework circuitry 1308 illustrated in FIG. 13), which can include module circuitry 1427a (such as module circuitry 1310) and entity circuitry 1427b (such as entity circuitry 1312). The applications 1422 may include hardware (such as circuits and/or microprocessors), firmware, software, or any combination thereof. The ROM 1414 can include basic input/output system (BIOS) 1415 of the electronic device 1400.

The power supply 1406 contains power components, and facilitates supply and management of power to the electronic device 1400. The input/output components can include the interfaces for facilitating communication between any components of the electronic device 1400, components of external devices (such as components of other devices of the information system 100), and end users. For example, such components can include a network card that is an integration of a receiver, a transmitter, and I/O interfaces, such as input/output interfaces 1440. The I/O components, such as I/O interfaces 1440, can include user interfaces such as monitors, keyboards, touchscreens, microphones, and speakers. Further, some of the I/O components, such as I/O interfaces 1440, and the bus 1404 can facilitate communication between components of the electronic device 1400, and can ease processing performed by the CPU 1402.

As used in the present description, search engines may include Boolean search engines and semantic search engine techniques. The term "Boolean search engine" refers to a search engine capable of parsing Boolean-style syntax, such as may be used in a search query. A Boolean search engine may allow the use of Boolean operators (such as AND, OR, NOT, or XOR) to specify a logical relationship between search terms. For example, the search query "college OR university" may return results with "college," results with "university," or results with both, while the search query "college XOR university" may return results with "college" or results with "university," but not results with both.

In contrast to Boolean-style syntax, "semantic search" refers a search technique in which search results are evaluated for relevance based at least in part on contextual meaning associated with query search terms. In contrast with Boolean-style syntax to specify a relationship between search terms, a semantic search may attempt to infer a meaning for terms of a natural language search query. Semantic search may therefore employ "semantics" (e.g., science of meaning in language) to search repositories of various types of content.

Search results located during a search of an index performed in response to a search query submission may typically be ranked. An index may include entries with an index entry assigned a value referred to as a weight. A search query may comprise search query terms, wherein a query term may correspond to an index entry. In an embodiment, search results may be ranked by scoring located files or records, for example, such as in accordance with number of times a query term occurs weighed in accordance with a weight assigned to an index entry corresponding to the query term. Other aspects may also affect ranking, such as, for example, proximity of query terms within a located record or file, or semantic usage, for example. A score and an identifier for a located record or file, for example, may be stored in a respective entry of a ranking list. A list of search results may be ranked in accordance with scores, which may, for example, be provided in response to a search query. In some embodiments, machine-learned ranking (MLR) models are used to rank search results. MLR is a type of supervised or semi-supervised machine learning problem with the goal to automatically construct a ranking model from training data.

In one embodiment, as an individual interacts with a software application, e.g., an instant messenger or electronic mail application, descriptive content, such in the form of signals or stored physical states within memory, such as, for example, an email address, instant messenger identifier, phone number, postal address, message content, date, time, etc., may be identified. Descriptive content may be stored, typically along with contextual content. For example, how a phone number came to be identified (e.g., it was contained in a communication received from another via an instant messenger application) may be stored as contextual content associated with the phone number. Contextual content, therefore, may identify circumstances surrounding receipt of a phone number (e.g., date or time the phone number was received) and may be associated with descriptive content. Contextual content, may, for example, be used to subsequently search for associated descriptive content. For example, a search for phone numbers received from specific individuals, received via an instant messenger application or at a given date or time, may be initiated.

Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

A profile builder may initiate generation of a profile, such for users of an application, including a search engine, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example. A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of search results, such as with respect to a particular user.

Advertising may include sponsored search advertising, non-sponsored search advertising, guaranteed and non-guaranteed delivery advertising, ad networks/exchanges, ad targeting, ad serving, and/or ad analytics. Various monetization techniques or models may be used in connection with sponsored search advertising, including advertising associated with user search queries, or non-sponsored search advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo!, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

An "ad server" comprises a server that stores online advertisements for presentation to users. "Ad serving" refers to methods used to place online advertisements on websites, in applications, or other places where users are more likely to see them, such as during an online session or during computing platform use, for example. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system stored in a non-transitory medium executable by processor circuitry for providing search results to a mobile user device, the system comprising:
   query processing circuitry for identifying a plurality of search results related to a search query from a mobile user device;
   analytics circuitry for selecting a first sponsored verb and a second sponsored verb for a search result object, the search result object from the plurality of search results;
   display logic circuitry communicatively coupled to the interface circuitry that dynamically generates a first interface element for the first sponsored verb and a second interface element for the second sponsored verb, and that displays on the mobile user device, in response to the search query, the first interface element and the second interface element as sub-components of the search result object.

2. The system of claim 1, further comprising:
   targeting circuitry for determining a set of verb keywords associated with at least one of the plurality of search results; and
   monetization circuitry for conducting auctions allowing advertisers to bid on at least one of the first verb keyword or the second verb keyword from the set of verb keywords.

3. The system of claim 2, wherein the first sponsored verb and the second sponsored verb are selected from verb keywords that were auctioned and bid on by at least one of the advertisers.

4. The system of claim 2, wherein the monetization circuitry further allows the advertisers to customize a responsive action that is executed when the user interacts with the first interface element or the second interface element.

5. The system of claim 4, wherein the responsive action includes deep linking to an application installed on the mobile user device or installing an application on the mobile user device.

6. The system of claim 4, wherein the first sponsored verb and the second sponsored verb are selected based on at least one of a bid value, an historical targeting data for the verb keywords, or a relevance of the responsive action to search query.

7. The system of claim 1, wherein the query processing circuitry further identifies a user intent related to the search query.

8. The system of claim 7, further comprising targeting circuitry for determining a set of verb keywords associated with at least one of the plurality of search results, wherein the set of verb keywords are determined based on a relevance of the verb keywords to the user intent.

9. The system of claim 1, wherein the query processing circuitry further identifies a context associated with submission of the search query, the context defining additional information about a context in which the search query is executed.

10. The system of claim 9, further comprising targeting circuitry for determining a set of verb keywords associated with at least one of the plurality of search results, wherein the set of verb keywords are determined based on a relevance of the verb keywords to the context.

11. The system of claim 1, wherein the first sponsored verb and the second sponsored verb are each submitted by separate advertisers that each specified different responsive actions to take place upon the user selecting the first interface element or the second interface element, respectively.

12. A computer-implemented method of displaying search results on a mobile user device, the method comprising:
processing, by query processing circuitry communicatively coupled to a network communications circuitry, a search query from a mobile user device to identify search result objects associated with the search query;
receiving, at the network communications circuitry, at least one search result object associated with the search query;
determining, by analytics circuitry, a first sponsored verb and a second sponsored verb for the search result object;
generating, by display logic circuitry, a first interface element associated with the first sponsored verb and configured to trigger a first responsive action, and a second interface element associated with the second sponsored verb and configured to trigger a second responsive action, wherein the first responsive action is different from the second responsive action; and
displaying at the mobile user device, by the display logic circuitry, the first interface element and the second interface element.

13. The method of claim 12, wherein the first responsive action includes deep linking to an application installed on the mobile user device that submitted the search query or installing an application on the mobile user device.

14. The method of claim 12, wherein the sponsored verbs are selected based on at least one of a bid value, an historical targeting data for the action words, or a relevance of the responsive action to search query.

15. The method of claim 12, wherein the first interface element and the second interface element are displayed as two separate sub-components of one search result object.

16. The method of claim 12, further comprising:
processing, by the query processing circuitry, the search query to identify a user intent related to the search query.

17. The method of claim 16, further comprising:
processing, by targeting circuitry, the search query and the at least one search result object to determine a set of action words associated with the search query and the at least one search result object, wherein the set of action words are determined based on a relevance of the action words to the user intent.

18. A system for displaying a search result on a mobile user device, the system comprising:
a means for identifying a search result object associated with a search query from a mobile user device;
a means for identifying a first verb and a second verb related to at least one of the search query or the search result object;
a means for generating a first call-to-action interface element associated with the first verb and that triggers a first responsive action when a user selects the first call-to-action interface element, and a means for generating a second call-to-action interface element associated with the second verb and that triggers a second responsive action when the user selects the second call-to-action interface element, the second responsive action being different from the first responsive action; and
a means for causing the mobile user device to display the search result object and the first call-to-action interface element and the second call-to-action interface element as sub-components of the search result object.

19. The system of claim 18, further comprising:
a means for receiving a first bid from a first advertiser for the first verb and receiving a second bid from a second advertiser for the second verb, wherein the first bid specifies the first responsive action and wherein the second bid specifies the second responsive action.

20. The system of claim 19, further comprising:
a means for determining a set of verb keywords related to at least one of the search query or the search result object, wherein the first verb and the second verb are selected from the set of verb keywords based at least partially on the first bid and the second bid.

* * * * *